United States Patent
Endou et al.

(10) Patent No.: US 10,106,738 B2
(45) Date of Patent: Oct. 23, 2018

(54) POLYMERIZABLE LIQUID CRYSTAL COMPOSITION, AND ANISOTROPIC OPTICAL BODY, RETARDATION FILM, ANTIREFLECTIVE FILM, AND LIQUID CRYSTAL, DISPLAY ELEMENT FABRICATED USING COMPOSITION

(71) Applicant: DIC CORPORATION, Tokyo (JP)

(72) Inventors: Koichi Endou, Kita-adachi-gun (JP); Yasuhiro Kuwana, Kita-adachi-gun (JP); Hidetoshi Nakata, Kita-adachi-gun (JP); Mika Yamamoto, Kita-adachi-gun (JP); Kazuaki Hatsusaka, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/035,608

(22) PCT Filed: Oct. 7, 2014

(86) PCT No.: PCT/JP2014/076776
§ 371 (c)(1),
(2) Date: May 10, 2016

(87) PCT Pub. No.: WO2015/076031
PCT Pub. Date: May 28, 2015

(65) Prior Publication Data
US 2016/0272888 A1 Sep. 22, 2016

(30) Foreign Application Priority Data

Nov. 20, 2013 (JP) .................................. 2013-239876

(51) Int. Cl.
| | |
|---|---|
| *G02F 1/1333* | (2006.01) |
| *C09K 19/20* | (2006.01) |
| *C08F 265/06* | (2006.01) |
| *C09K 19/04* | (2006.01) |
| *C09K 19/30* | (2006.01) |
| *C09K 19/52* | (2006.01) |
| *C08F 220/30* | (2006.01) |
| *C08F 222/10* | (2006.01) |

(52) U.S. Cl.
CPC ........ *C09K 19/2007* (2013.01); *C08F 265/06* (2013.01); *C09K 19/2014* (2013.01); *C09K 19/3068* (2013.01); *C08F 2220/303* (2013.01); *C08F 2222/102* (2013.01); *C09K 2019/0448* (2013.01); *C09K 2019/2035* (2013.01); *C09K 2019/2078* (2013.01); *C09K 2019/3075* (2013.01); *C09K 2019/3083* (2013.01); *C09K 2019/528* (2013.01)

(58) Field of Classification Search
CPC ............ C09K 19/2007; C09K 19/2014; C09K 19/3068; C09K 2019/0448; C09K 2019/2035; C09K 2019/2078; C09K 2019/3075; C09K 2019/3083; C09K 2019/528; G02F 1/1333; C08F 265/06; C08F 2220/303; C08F 2222/102
USPC ....................................... 252/299.67; 428/1.1
See application file for complete search history.

(56) References Cited

U.S. PATENT DOCUMENTS

| | | | |
|---|---|---|---|
| 2003/0085377 A1 | 5/2003 | Dunn et al. | |
| 2007/0134444 A1 | 6/2007 | Harding et al. | |
| 2010/0143612 A1* | 6/2010 | Hirai ..................... | C09K 19/20 428/1.25 |

FOREIGN PATENT DOCUMENTS

| | | |
|---|---|---|
| JP | 2003-105030 A | 4/2003 |
| JP | 2007-177241 A | 7/2007 |
| JP | 2009-242563 A | 10/2009 |
| JP | 2012-136652 A | 7/2012 |

OTHER PUBLICATIONS

International Search Report dated Jan. 6, 2015, issued in counterpart International Application No. PCT/JP2014/076776 (2 pages).

* cited by examiner

*Primary Examiner* — Geraldina Visconti
(74) *Attorney, Agent, or Firm* — Westerman, Hattori, Daniels & Adrian, LLP

(57) ABSTRACT

An object of the present invention is to provide a polymerizable liquid crystal composition with which two characteristics of smoothness of a surface of an anisotropic optical body and orientation properties of liquid crystals can be simultaneously improved, when preparing an anisotropic optical body to be obtained by photopolymerization of the polymerizable liquid crystal composition. Specifically, an object of the present invention is to provide a polymerizable liquid crystal composition containing specific polymerizable compounds and a fluorine-based surfactant. In addition, an anisotropic optical body, a retardation film, an antireflective film, and a liquid crystal display element prepared using the polymerizable liquid crystal composition of the present invention are also provided.

8 Claims, No Drawings

POLYMERIZABLE LIQUID CRYSTAL COMPOSITION, AND ANISOTROPIC OPTICAL BODY, RETARDATION FILM, ANTIREFLECTIVE FILM, AND LIQUID CRYSTAL, DISPLAY ELEMENT FABRICATED USING COMPOSITION

TECHNICAL FIELD

The present invention relates to a polymerizable liquid crystal composition which is useful as a constituent member of an anisotropic optical body used for optical compensation of a liquid crystal device, a display, an optical component, a colorant, a security marking, a member for laser emission, and a liquid crystal display, and an anisotropic optical body, a retardation film, an antireflective film, and a liquid crystal display element fabricated using composition.

BACKGROUND ART

A polymerizable liquid crystal composition is useful as a constituent member of an anisotropic optical body and the anisotropic optical body is applied to various liquid crystal displays as a retardation film and an antireflective film, for example. The anisotropic optical body having a liquid crystal material as a constituent element is obtained by applying the polymerizable liquid crystal composition to a substrate, heating or irradiating the substrate with an active energy ray in an oriented state to harden the polymerizable liquid crystal composition, but it is necessary to semi-permanently immobilize a structure of a state in which liquid crystal molecules in a liquid crystal state are evenly oriented, in order to obtain stable and even optical characteristics.

Polymerizable liquid crystal compositions containing surfactants have been proposed thus far, in order to improve coating properties on the substrate (see PTLs 1 and 2). The coating properties on the substrate have been improved and occurrence of unevenness in a film thickness can be reduced by the methods disclosed in PTLs described above, but orientation properties of liquid crystals have been affected.

CITATION LIST

Patent Literature

[PTL 1] JP-A-08-231958
[PTL 2] JP-A-2000-105315

SUMMARY OF INVENTION

Technical Problem

An object of the present invention is to provide a polymerizable liquid crystal composition with which two characteristics of smoothness of a surface of an anisotropic optical body and orientation properties of liquid crystals can be simultaneously improved, when preparing an anisotropic optical body to be obtained by photopolymerization of the polymerizable liquid crystal composition.

Solution to Problem

In order to solve the problems, the inventors have performed research by focusing on the polymerizable liquid crystal composition and provided the present invention.

That is, according to the aspect of the present invention, there is provided a polymerizable liquid crystal composition including:

one or more polymerizable compounds represented by General Formula (I),

[Chem. 1]

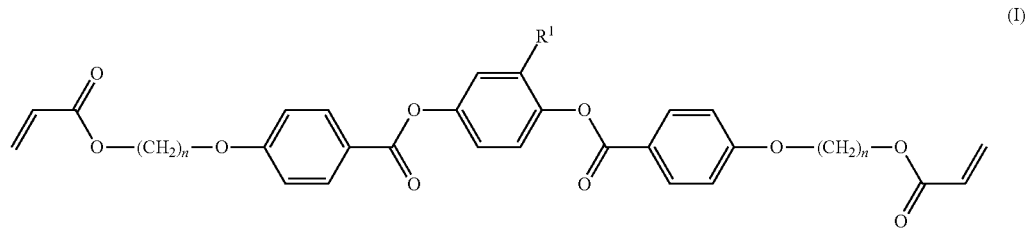

(I)

(where n represents an integer of 1 to 10 and $R^1$ represents a hydrogen atom or a methyl group);

at least one polymerizable compound selected from the group consisting of compounds represented by General Formula (II-1) to General Formula (II-5),

[Chem. 2]

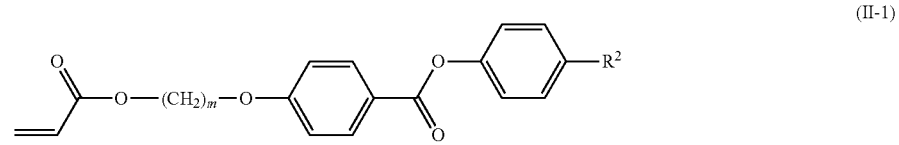

(II-1)

-continued

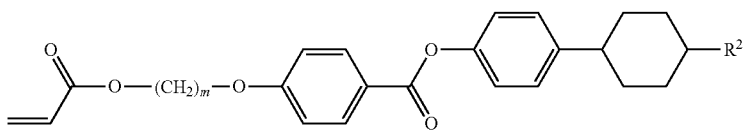
(II-2)

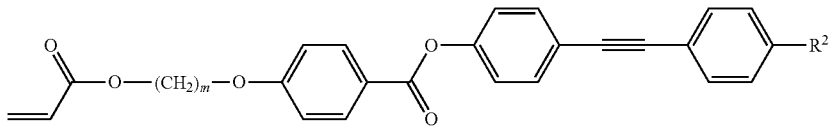
(II-3)

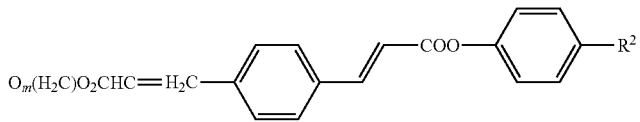
(II-4)

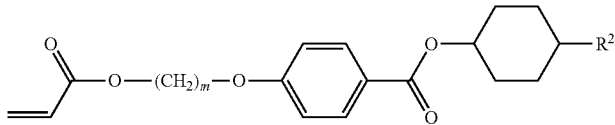
(II-5)

(where m each independently represents an integer of 1 to 10, $R^2$ each independently represents an alkyl group having 1 to 10 carbon atoms, an alkoxy group having 1 to 10 carbon atoms, a hydrogen atom, a fluorine atom, a chlorine atom, or a cyano group, and the 1,4-phenylene group each may be independently substituted with a fluorine atom, a chlorine atom, a $CF_3$ group, a $OCF_3$ group, a cyano group, an alkyl group having 1 to 8 carbon atoms, an alkoxy group, an alkanoyl group, and an alkanoyloxy group); and a fluorine-based surfactant.

In addition, there is also provided an anisotropic optical body using the polymerizable liquid crystal composition of the present invention.

Advantageous Effects of Invention

It is possible to obtain an anisotropic optical body having excellent smoothness of a surface and orientation properties of liquid crystals, by using the polymerizable liquid crystal composition of the present invention.

DESCRIPTION OF EMBODIMENTS

Hereinafter, preferred embodiments of a polymerizable liquid crystal composition according to the present invention will be described, but in the present invention, "liquid crystals" of the polymerizable liquid crystal composition means liquid crystal properties after applying the polymerizable liquid crystal composition to a substrate and drying the polymerizable liquid crystal composition. In addition, the polymerizable liquid crystal composition can be polymerized (obtained as a film state) by performing a polymerization treatment of the polymerizable liquid crystal composition by light irradiation with ultraviolet light or heating.

(Bifunctional Polymerizable Compound)

The polymerizable liquid crystal composition of the present invention contains one kind or two or more kinds of bifunctional polymerizable compounds represented by General Formula (I).

[Chem. 3]

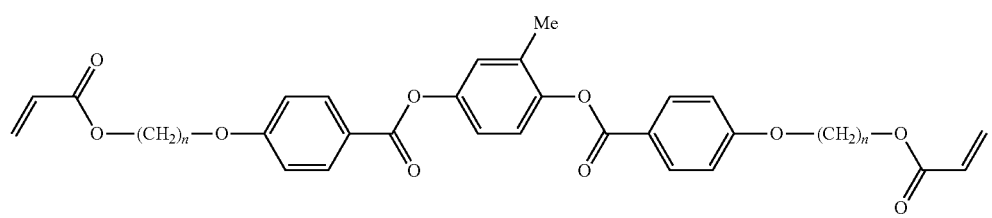
(I)

n represents an integer of 1 to 10, and is preferably an integer of 1 to 9 and more preferably an integer of 2 to 8, and R¹ represents a hydrogen atom or a methyl group, and is preferably a methyl group, and it is particularly preferable to use a compound represented by the following Formula (I-1) and/or Formula (I-2).

[Chem. 4]

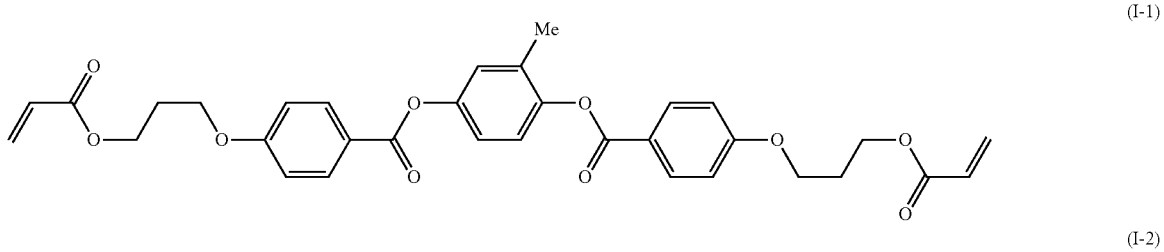
(I-1)

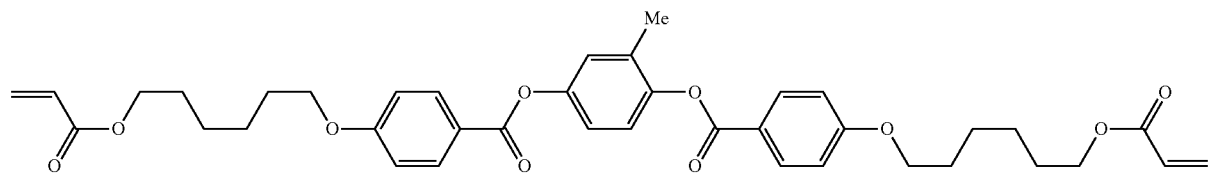
(I-2)

The polymerizable liquid crystal composition of the present invention containing one kind or two or more kinds of these bifunctional polymerizable compounds is preferably used, because the storage stability is improved and heat resistance or moist heat resistance of a hardened coating film is improved.

In the case of containing a chiral compound which will be described later, the total content of a bifunctional polymerizable compound including two polymerizable functional groups in a molecule is preferably 8% to 85% by mass, more preferably 10% to 80% by mass, and particularly preferably 12% to 75% by mass, with respect to the total content of the polymerizable compound and the chiral compound used.

In the case of not using the chiral compound, the total content of the bifunctional polymerizable compound including two polymerizable functional groups in a molecule is preferably 15% to 85% by mass, more preferably 20% to 80% by mass, and particularly preferably 25% to 75% by mass, with respect to the total content of the polymerizable compound used.

(Monofunctional Polymerizable Compound)

The polymerizable liquid crystal composition of the present invention contains one kind or two or more kinds of monofunctional polymerizable compounds selected from the group consisting of compounds represented by General Formulae (II-1) to (II-5).

[Chem. 5]

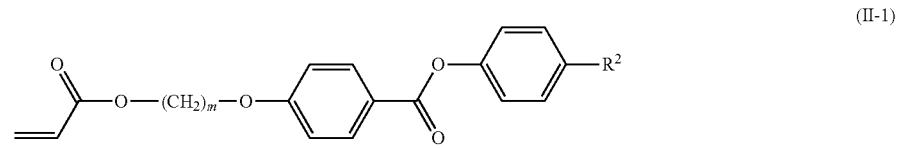
(II-1)

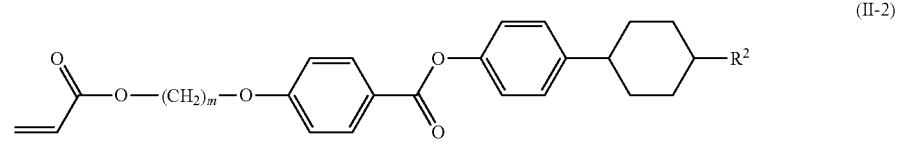
(II-2)

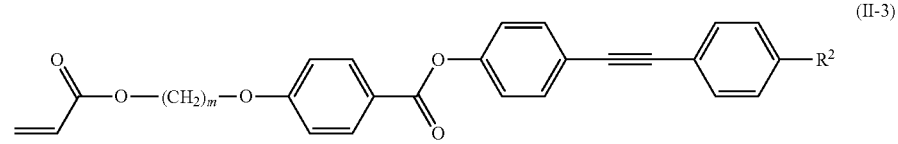
(II-3)

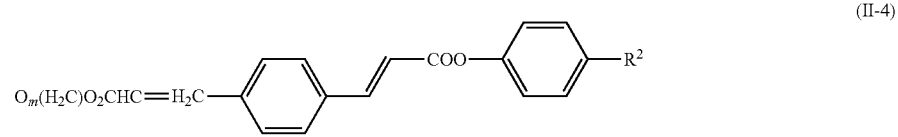
(II-4)

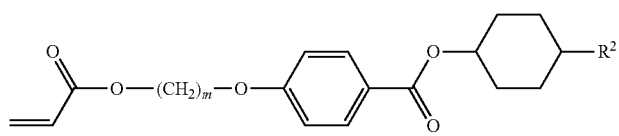
(II-5)

m each independently represents an integer of 1 to 10, and is preferably an integer of 1 to 9 and more preferably an integer of 2 to 8, $R^2$ each independently represents an alkyl alkanoyloxy group. It is preferable to use compounds represented by the following Formula (II-1-1) to Formula (II-5-1).

[Chem. 6]

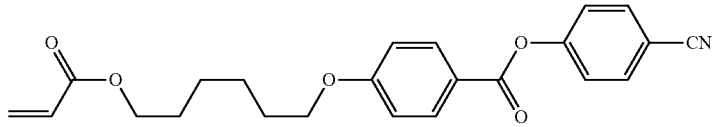
(II-1-1)

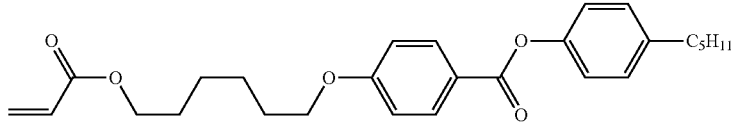
(II-1-2)

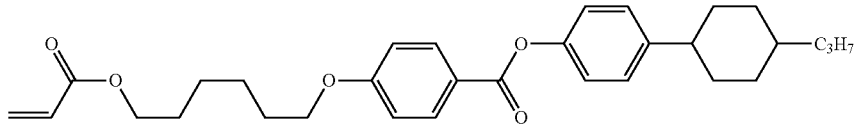
(II-2-1)

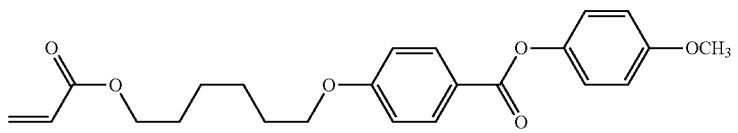
(II-1-3)

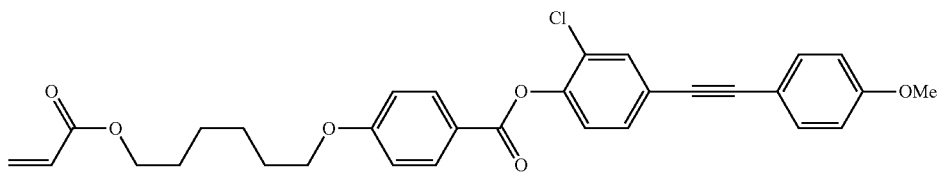
(II-3-1)

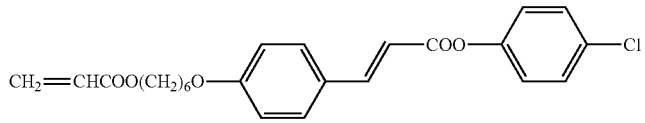
(II-4-1)

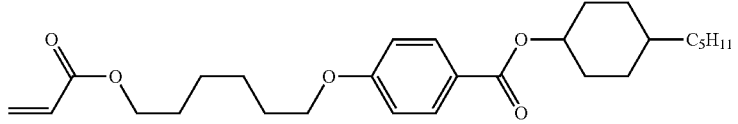
(II-5-1)

group having 1 to 10 carbon atoms, an alkoxy group having 1 to 10 carbon atoms, a hydrogen atom, a fluorine atom, a chlorine atom, or a cyano group, and is preferably an alkyl group having 1 to 5 carbon atoms, an alkoxy group having 1 to 4 carbon atoms, a hydrogen atom, a fluorine atom, a chlorine atom, or a cyano group, and the 1,4-phenylene group in the formulae each may be independently substituted with a fluorine atom, a chlorine atom, a $CF_3$ group, a $OCF_3$ group, a cyano group, an alkyl group having 1 to 8 carbon atoms, an alkoxy group, an alkanoyl group, and an The polymerizable liquid crystal composition of the present invention contains one kind or two or more kinds of monofunctional polymerizable compounds selected from the group consisting of compounds represented by Formula (II-1-1) to Formula (II-5-1). In particular, it is preferable to use any one kind of the compound represented by Formula (II-2-1) and the compound represented by Formula (II-1-3) or both of the compounds, because an anisotropic optical body having excellent orientation properties is obtained. In addition, it is preferable to contain the compound represented by Formula (II-1-1), because an anisotropic optical body having excellent orientation properties is obtained.

The total content of the compounds including one polymerizable functional group in a molecule represented by Formula (II-1) to Formula (II-5) is preferably 5% to 85% by mass, more preferably 5% to 80% by mass, and particularly preferably 5% to 75% by mass, with respect to the total content of the polymerizable compound and the chiral compound used.

In the case of not using the chiral compound, the total content of the compounds including one polymerizable functional group in a molecule represented by Formula (II-1) to Formula (II-5) is preferably 15% to 85% by mass, more preferably 20% to 80% by mass, and particularly preferably 25% to 75% by mass, with respect to the total content of the polymerizable compound used.

The polymerizable liquid crystal composition of the present invention can contain polymerizable compounds other than the monofunctional polymerizable compounds represented by Formula (II-1) to Formula (II-5). Specifically, a compound represented by Formula (II-7) can be exemplified.

[Chem. 7]

P—(Sp)$_m$-MG-R$^1$ (II-7)

In the formula, P represents a polymerizable functional group, Sp represents a spacer group having 0 to 18 carbon atoms, m represents 0 or 1, MG represents a mesogenic group or a mesogenic support group, R$^1$ represents a halogen atom, a cyano group, or an alkyl group having 1 to 18 carbon atoms, the alkyl group may be substituted with one or more of halogen atoms or CN, and one CH$_2$ group or two or more CH$_2$ groups which are not adjacent to each other present in this group may be each independently substituted with —O—, —S—, —NH—, —N(CH$_3$)—, —CO—, —COO—, —OCO—, —OCOO—, —SCO—, —COS—, or —C≡C—, provided that oxygen atoms are not directly bonded to each other, with the proviso that the compounds represented by Formula (II-1) to Formula (II-5) are excluded.

More specifically, in Formula (II-7), Sp represents an alkylene group (the alkylene group may be substituted with one or more of halogen atoms or CN, and one CH$_2$ group or two or more CH$_2$ groups, which are not adjacent to each other present in this group, may be substituted with —O—, —S—, —NH—, —N(CH$_3$)—, —CO—, —COO—, —OCO—, —OCOO—, —SCO—, —COS—, or —C≡C—, provided that oxygen atoms are not directly bonded to each other), and MG represents a compound represented by Formula (II-7-b).

[Chem. 8]

—Z0-(A1-Z1)$_n$-A2-Z2-A3-Z3- (II-7-b)

In the formula, A1, A2, and A3 each independently represent a 1,4-phenylene group, a 1,4-cyclohexylene group, a 1,4-cyclohexenyl group, a Tetrahydropyran-2,5-diyl group, a 1,3-dioxane-2,5-diyl group, a tetrahydrothiopyran-2,5-diyl group, a 1,4-bicyclo(2,2,2) octylene group, a decahydronaphthalene-2,6-diyl group, a pyridine-2,5-diyl group, a pyrimidine-2,5-diyl group, a pyrazine-2,5-diyl group, a thiophene-2,5-diyl group, a 1,2,3,4-tetrahydronaphthalene-2,6-diyl group, 2,6-naphthylene group, a phenanthrene-2,7-diyl group, a 9,10-dihydro-phenanthrene-2,7-diyl group, a 1,2,3,4,4a,9,10a-octahydrophenanthrene-2,7-diyl group, a 1,4-naphthylene group, a benzo[1,2-b:4,5-b'] dithiophene-2,6-diyl group, a benzo[1,2-b:4,5-b'] diselenophene-2,6-diyl group, a [1]benzothieno[3,2-b] thiophene-2,7-diyl group, a [1]benzoselenopheno[3,2-b] selenophene-2,7-diyl group, or a fluorene-2,7-diyl group, which may have one or more of F, Cl, CF$_3$, OCF$_3$, a CN group, an alkyl group having 1 to 8 carbon atoms, an alkoxy group, an alkanoyl group, an alkanoyloxy group, an alkenyl group having 2 to 8 carbon atoms, an alkenyloxy group, an alkenoyl group, and an alkenoyloxy group as a substituent, Z0, Z1, Z2, and Z3 each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO—, an alkyl group having 2 to 10 carbon atoms which may include a halogen atom, or a single bond, and n represents 0, 1, or 2.

The polymerizable functional group is preferably a vinyl group, a vinyl ether group, an acrylic group, a (meth)acryl group, a glycidyl group, an oxetanyl group, a maleimide group, and a thiol group, more preferably a vinyl ether group, an acrylic group, a (meth)acryl group, and a glycidyl group from a viewpoint of productivity, and particularly preferably an acrylic group and a (meth)acryl group.

The following are shown as exemplified compounds, but there is no limitation.

[Chem. 9]

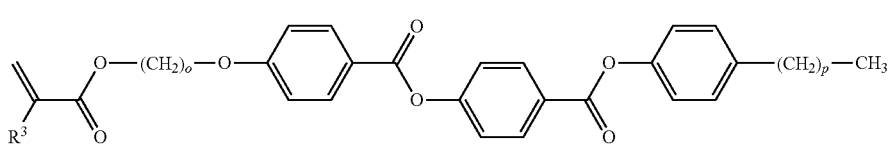

(II-7-1)

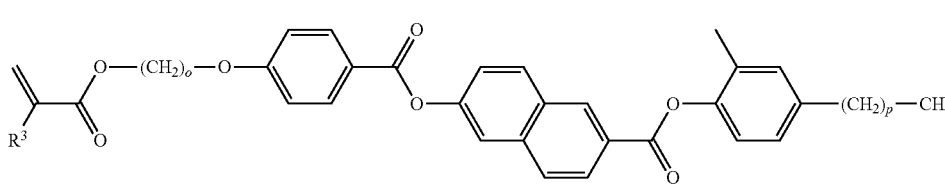

(II-7-2)

-continued (II-7-3)
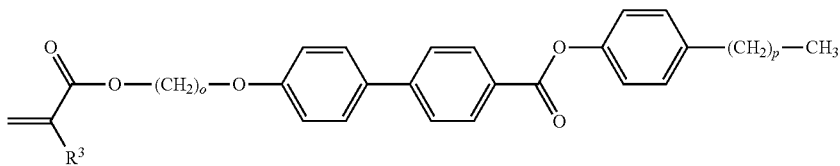

(II-7-4)
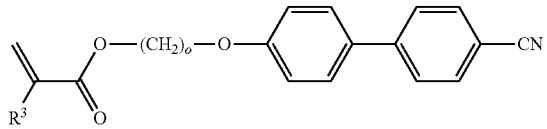

(II-7-5)
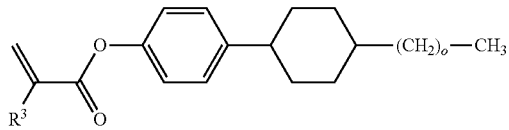

(II-7-6)
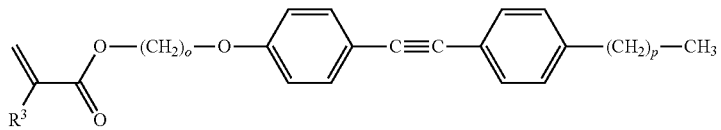

In the formulae, o and p each independently represent an integer of 1 to 18, $R^3$ represents a hydrogen atom, a halogen atom, an alkoxy group having 1 to 6 carbon atoms, and a cyano group. In the case where these groups are an alkoxy group having 1 to 6 carbon atoms, all of the groups may be unsubstituted or substituted with one or two or more halogen atoms. These compounds can be used alone or can be used in combination of two or more kinds thereof.

The total content of the monofunctional polymerizable compounds other than the compounds including one polymerizable functional group in a molecule represented by Formula (II-1) to Formula (II-5) is preferably 0% to 10% by mass, more preferably 0% to 8% by mass, and particularly preferably 0% to 5% by mass, with respect to the total content of the polymerizable compound and the chiral compound used.

In the case of not using the chiral compound, the total content of the monofunctional polymerizable compounds other than the compounds represented by Formula (II-1) to Formula (II-5) is preferably 0% to 10% by mass, more preferably 0% to 8% by mass, and particularly preferably 0% to 5% by mass, with respect to the total content of the polymerizable compound used.

The chiral compound may be combined with the polymerizable liquid crystal composition of the present invention in order to obtain a chiral nematic phase. Among the chiral compounds, a compound including a polymerizable functional group in a molecule is particularly preferable.

An acryloyloxy group is particularly preferable as the polymerizable functional group in the chiral compound. It is necessary that the content of the combined chiral compound is suitably adjusted by a spiral induction force of the compound, and the content thereof is preferably 3% to 80% by mass, more preferably 3% to 75% by mass, and particularly preferably 3% to 70% by mass with respect to the total content of the polymerizable compound and the chiral compound used.

As specific examples of the chiral compound, compounds of Formulae (1-1) to (1-8) can be exemplified.

[Chem. 10]

(1-1)
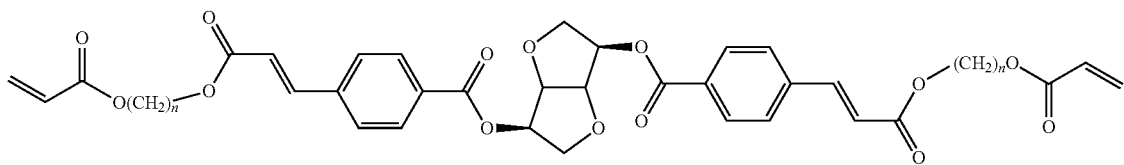

(1-2)
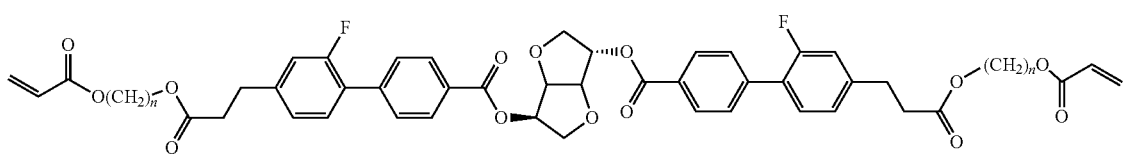

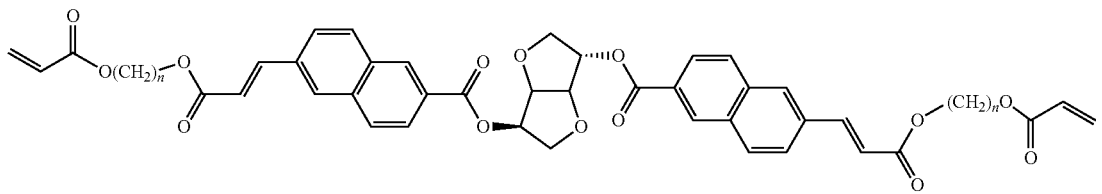
(1-3)
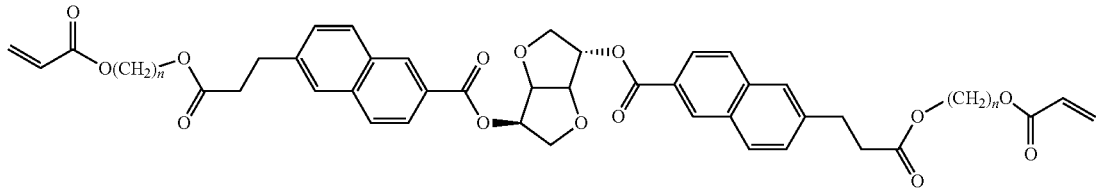
(1-4)
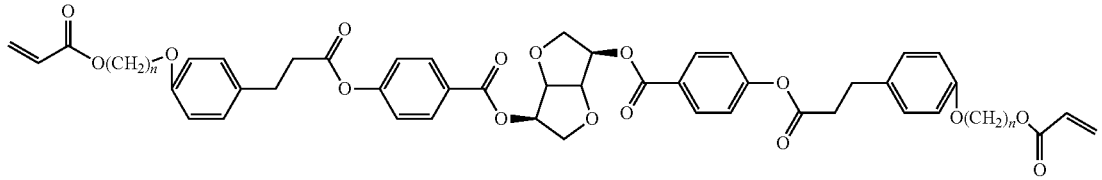
(1-5)
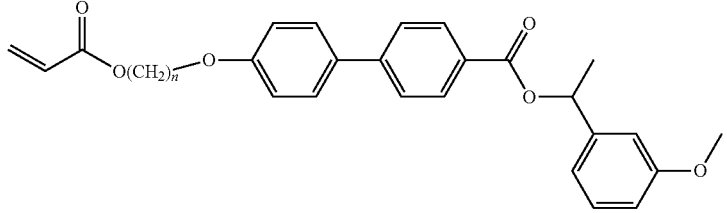
(1-6)
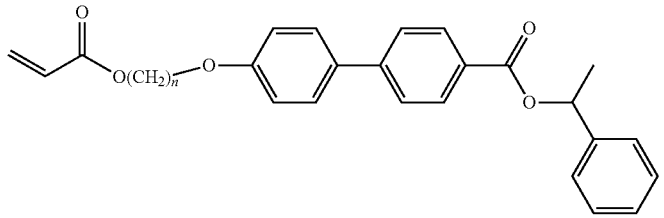
(1-7)
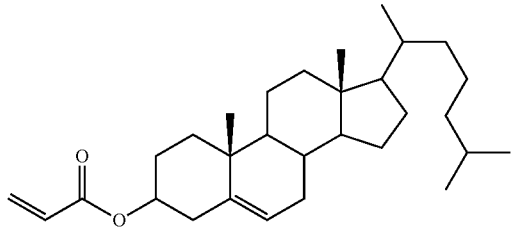
(1-8)
In the formulae, n represents an integer of 2 to 12. In addition, as specific examples of the chiral compound, compounds of Formulae (1-9) to (1-12) can also be exemplified.

[Chem. 11]

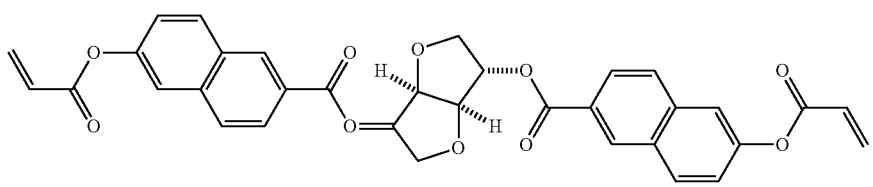

(1-9)

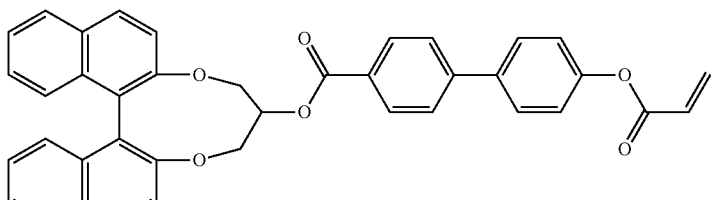

(1-10)

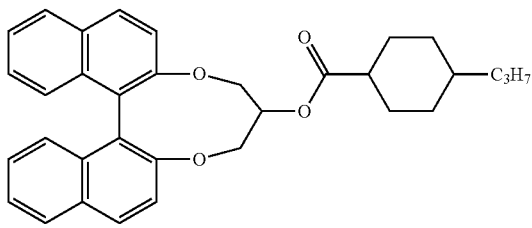

(1-11)

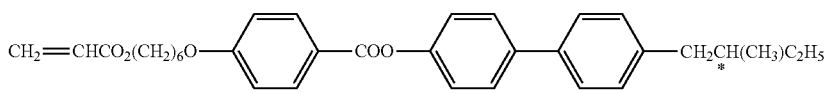

(1-12)

(Fluorine-Based Surfactant)

The polymerizable liquid crystal composition of the present invention contains a fluorine-based surfactant (III), and by using the fluorine-based surfactant, the polymerizable liquid crystal composition of the present invention has excellent compatibility between the polymerizable compound and the fluorine-based surfactant, and accordingly, excellent solution stability is obtained, and surface smoothness (cissing resistance) in the case where an anisotropic optical body is obtained, is excellent.

The fluorine-based surfactant is preferably configured with only a carbon atom, a hydrogen atom, an oxygen atom, a fluorine atom, and a nitrogen atom. The surfactant configured with these atoms is the same as atoms configuring a structure (spacer (Sp) part or mesogenic (MG) part) other than terminal parts (terminal groups) of the polymerizable compound used in the present invention, and therefore, it is considered that this is for increasing the compatibility with the polymerizable compound.

The fluorine-based surfactant preferably contains a group represented by —(XO)$_s$— (X is an alkylene group having 1 to 10 carbon atoms and s is an integer equal to or greater than 1), because the surface smoothness (cissing resistance) in the case where an anisotropic optical body is obtained, is excellent. X represents an alkylene group, and is preferably an ethylene group, a propylene group, a butylene group, or a tetramethylene group, and more preferably an ethylene group, a propylene group, or a butylene group. In the present invention, the term "butylenes" means a branched alkylene having 4 carbon atoms and the term "tetramethylene" means a linear alkylene having 4 carbon atoms.

As the fluorine-based surfactant used in the present invention, it is preferable to use a fluorine-based surfactant having a weight average molecular weight (Mw) of 3,000 to 50,000. When a fluorine-based surfactant having a weight average molecular weight which is smaller than 3,000 is used, the surface smoothness (cissing properties) in the case where the polymerizable liquid crystal composition containing the compound is applied to a substrate and an anisotropic optical body is obtained, is not significantly improved. When a fluorine-based surfactant having a weight average molecular weight which is higher than 50,000 is used, compatibility with the polymerizable liquid crystal composition decreases, and therefore, the surface smoothness may be negatively affected. The molecular weight distribution (Mw/Mn) represented by a ratio of the weight average molecular weight (Mw) to a number average molecular weight (Mn) is preferably 1.05 to 5.00. Herein, the weight average molecular weight (Mw) and the number average molecular weight (Mn) are values obtained by polystyrene conversion based on gel permeation chromatography (GPC) measurement. The measurement conditions of GPC are as follows.

[Measurement Conditions of GPC]

Measurement device: "HLC-8220 GPC" manufactured by Tosoh Corporation, column: Guard Column "HHR-H" (6.0 mm I. D.×4 cm) manufactured by Tosoh Corporation+"TSK-GEL GMHHR-N" (7.8 mm I. D.×30 cm) manufactured by Tosoh Corporation+"TSK-GEL GMHHR-N" (7.8 mm I. D.×30 cm) manufactured by Tosoh Corporation+"TSK-GEL GMHHR-N" (7.8 mm I. D.×30 cm) manufactured by Tosoh Corporation+"TSK-GELGMHHR-N" (7.8 mm I. D.×30 cm) manufactured by Tosoh Corporation Measurement conditions: column temperature of 40° C., developing solution: tetrahydrofuran (THF), flow rate: 1.0 ml/min Sample: a material obtained by filtrating 1.0% by mass, in terms of resin solid, of a tetrahydrofuran solution using a microfilter (5 μl)

Reference sample: monodisperse polystyrene which will be described below having a well-known molecular weight was used based on the measurement manual "GPC-8020 model II data analyzing version 4.30" described above.

[Disperse Polystyrene]

"A-500" manufactured by Tosoh Corporation, "A-1000" manufactured by Tosoh Corporation, "A-2500" manufactured by Tosoh Corporation "A-5000" manufactured by Tosoh Corporation, "F-1" manufactured by Tosoh Corporation, "F-2" manufactured by Tosoh Corporation "F-4" manufactured by Tosoh Corporation, "F-10" manufactured by Tosoh Corporation, "F-20" manufactured by Tosoh Corporation "F-40" manufactured by Tosoh Corporation, "F-80" manufactured by Tosoh Corporation, "F-128" manufactured by Tosoh Corporation "F-288" manufactured by Tosoh Corporation, "F-550" manufactured by Tosoh Corporation The added amount of the fluorine-based surfactant is preferably 0.005% to 5% by mass, more preferably 0.01% to 3% by mass, and even more preferably 0.05% to 2.0% by mass with respect to the total content of the polymerizable compound and the chiral compound. It is preferable that the added amount of the fluorine-based surfactant is suitably adjusted by considering the molecular weight of the fluorine-based surfactant to be incorporated. Generally, in the case of using the fluorine-based surfactant having a low molecular weight, it is desired to add a larger amount of the fluorine-based surfactant, compared to the case of using the fluorine-based surfactant having a high molecular weight, but the range described above is preferable, in the case of using the fluorine-based surfactant having the weight average molecular weight (Mw) of approximately 3,000 to 50,000.

The fluorine-based surfactant (III) preferably contains an oxyalkylene group represented by $-(XO)_s-$ (X is an alkylene group having 1 to 10 carbon atoms and s is an integer equal to or greater than 1). The oxyalkylene group is preferably an oxyethylene group, an oxypropylene group, an oxybutylene group, or an oxytetramethylene group.

In addition, the fluorine-based surfactant (III) may contain a fluoroalkyl group, a fluoroalkenyl group, and/or a fluoroalkylene ether group. The fluoroalkyl group, the fluoroalkenyl group, and/or the fluoroalkylene ether group are partially fluorinated or entirely fluorinated, and a linear or branched fluoroalkyl group, a fluoroalkenyl group, and/or a fluoroalkylene ether group having approximately 3 to 12 carbon atoms can be exemplified.

Examples of the fluorine-based surfactant to be used in the present invention include a copolymer (III-1) obtained by performing copolymerization using a polymerizable monomer (A) including a fluoroalkyl group having 4 to 6 carbon atoms (which may contain an ether bond formed by an oxygen atom), and a polymerizable monomer (B) including an oxyalkylene group and a polymerizable unsaturated group represented by the following General Formula (B), as essential monomers.

As the polymerizable monomer (A), a monomer represented by the following General Formula (A1) can be exemplified.

[Chem. 12]

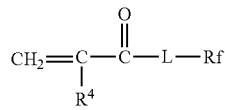

(A1)

In General Formula (A1), $R^4$ represents a hydrogen atom, a fluorine atom, a methyl group, a cyano group, a phenyl group, a benzyl group, or $-C_nH_{2n}-Rf'$ (n represents an integer of 1 to 8 and Rf' represents any one group of the following Formulae (Rf-1) to (Rf-7)), L represents any one group of the following Formulae (L-1) to (L-10), and Rf represents any one group of the following Formulae (Rf-1) to (Rf-7).

[Chem. 13]

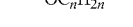 (L-1)

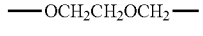 (L-2)

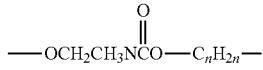 (L-3)

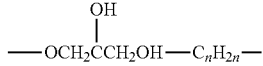 (L-4)

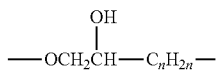 (L-5)

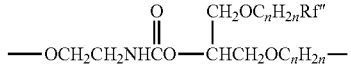 (L-6)

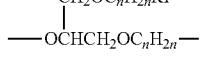 (L-7)

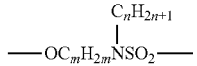 (L-8)

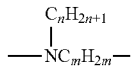 (L-9)

 (L-10)

n in Formulae (L-1), (L-3), (L-5), (L-6), and (L-7) represents an integer of 1 to 8. m in Formulae (L-8), (L-9), and (L-10) represents an integer of 1 to 8 and n represents an integer of 0 to 8. Rf" in Formulae (L-6) and (L-7) represents any one group of the following Formulae (Rf-1) to (Rf-7).

[Chem. 14]

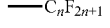 (Rf-1)

 (Rf-2)

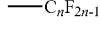 (Rf-3)

-continued

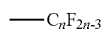 (Rf-4)

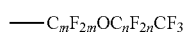 (Rf-5)

 (Rf-6)

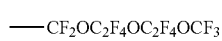 (Rf-7)

n in Formulae (Rf-1) to (Rf-4) represents an integer of 4 to 6. m in Formula (Rf-5) represents an integer of 1 to 5, n represents an integer of 0 to 4, and the total of m and n is 4 to 5. m in Formula (Rf-6) represents an integer of 0 to 4, n represents an integer of 1 to 4, p represents an integer of 0 to 4, and the total of m, n, and p is 4 to 5.

As more preferable examples of the polymerizable monomer (A), the following monomers (A-1) to (A-15) are exemplified. These monomers (A) can be used alone or in combination of two or more kinds thereof.

[Chem. 15]

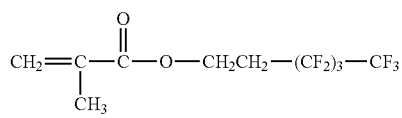 (A-1)

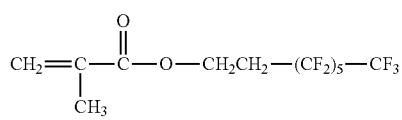 (A-2)

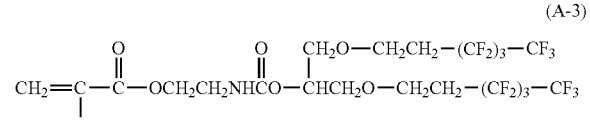 (A-3)

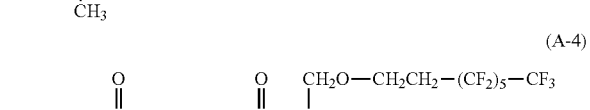 (A-4)

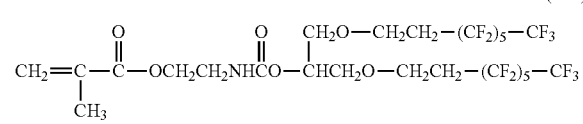 (A-5)

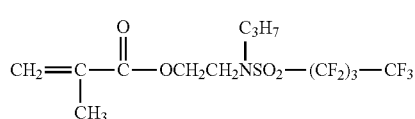 (A-6)

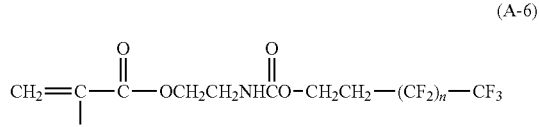 (A-7)

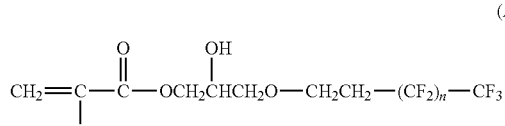 (A-8)

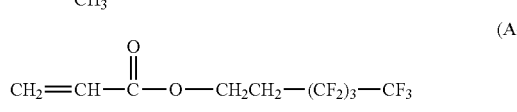 (A-9)

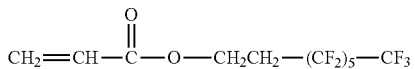 (A-9)

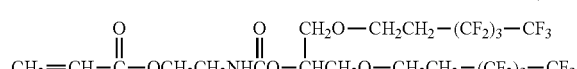 (A-10)

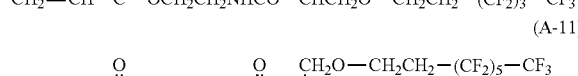 (A-11)

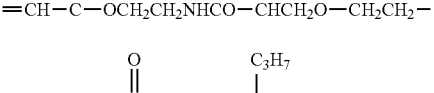 (A-12)

 (A-13)

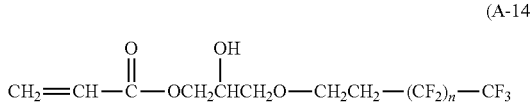 (A-14)

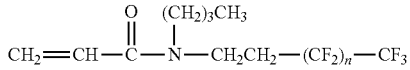 (A-15)

The polymerizable monomer (B) is a monomer having an oxyalkylene chain. As the monomer, a monomer represented by General Formula (B) can be exemplified.

[Chem. 16]

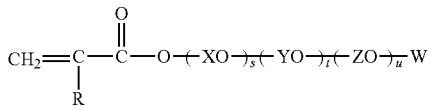 (B)

In the formula, R represents a hydrogen atom or a methyl group, x, Y, and Z each independently represent an alkylene group, s represents an integer equal to or greater than 1, t and u each represent an integer of 0 or an integer equal to or greater than 1, and W represents a hydrogen atom or an alkyl group having 1 to 6 carbon atoms.

X, Y, and Z in General Formula (B) each independently represent an alkylene group having 1 to 10 carbon atoms, and this alkylene group may include a substituent group. Specific examples of the part of —O—(XO)s-(YO)t-(ZO)u- include polyoxypropylene in which the repeating unit number s is an integer equal to or greater than 3, t and u are 0, and X is propylene, polyoxybutylene in which the repeating unit number s is an integer equal to or greater than 3, t and u are 0, and X is butylene, polyoxytetramethylene in which the repeating unit number s is an integer equal to or greater than 3, t and u are 0, and X is tetramethylene, polyoxyalkylene which is a copolymer of ethylene oxide and propylene oxide and in which the repeating unit numbers s and t are both an integer equal to or greater than 1, u is 0, and X or Y is ethylene and the other one is propylene, polyoxyalkylene which is a copolymer of propylene oxide and butylene oxide and in which the repeating unit numbers s and t are both an integer equal to or greater than 1, u is 0, and X or Y is propylene and the other one is butylene, polyoxyalkylene which is a copolymer of ethylene oxide and tetrahydrofuran and in which the repeating unit numbers s and t are both an integer equal to or greater than 1, u is 0, and X or Y is ethylene and the other one is tetramethylene, polyoxyalkylene which is a copolymer of propylene oxide and tetrahydrofuran and in which the repeating unit numbers s and t are both an integer equal to or greater than 1, u is 0, and X or Y is propylene and the other one is tetramethylene, and polyoxyalkylene which is a copolymer of ethylene oxide, propylene oxide, and ethylene oxide and in which all of the repeating unit numbers s, t, and u are an integer equal to or greater than 1, X and Z are ethylene, and Y is propylene.

A polymerization degree of these polyoxyalkylenes, that is, the total of s, t, and u in General Formula (B) is preferably 3 to 50. The repeating unit containing X, the repeating unit containing Y, and the repeating unit containing Z may be arranged randomly or in a block state.

The monomers including at least a polyoxypropylene chain, a polyoxybutylene chain, or a polyoxytetramethylene chain among polyoxyalkylene chains included in the monomer (B) are preferable, because more excellent cissing resistance is exhibited, in the case where the monomer is added to the polymerizable liquid crystal composition of the present invention. The monomer including at least the polyoxypropylene chain, the polyoxybutylene chain, or the polyoxytetramethylene chain may be a monomer having the polyoxyalkylene chain alone or may be a copolymer of the polyoxyalkylene chain and another polyoxyalkylene chain.

In the case where the repeating unit number s is an integer equal to or greater than 3 and t and u are 0, examples of the monomer (B) include mono(meth)acrylic ester of polyalkylene glycol such as polypropylene glycol, polybutylene glycol, or polytetramethylene glycol, and a monomer in which a terminal which is not (meth)acrylic ester of mono (meth)acrylic ester of polyalkylene glycol is sealed by an alkyl group having 1 to 6 carbon atoms.

More specific examples of the monomer (B) include polypropylene glycol mono(meth)acrylate, polytetramethylene glycol (meth)acrylate, poly(ethylene glycol-propylene glycol) mono(meth)acrylate, polyethylene glycol-polypropylene glycol mono(meth)acrylate, poly(ethylene glycol-tetramethylene glycol) mono(meth)acrylate, polyethylene glycol-polytetramethylene glycol mono(meth)acrylate, poly(propylene glycol-tetramethylene glycol) mono(meth)acrylate, polypropylene glycol-polytetramethylene glycol mono (meth)acrylate, poly(propylene glycol-butylene glycol) mono(meth)acrylate, polypropylene glycol-polybutylene glycol mono(meth)acrylate, poly(ethylene glycol-butylene glycol) mono(meth)acrylate, polyethylene glycol-polybutylene glycol mono(meth)acrylate, poly(tetraethylene glycol-butylene glycol) mono(meth)acrylate, polytetraethylene glycol-polybutylene glycol mono(meth)acrylate, polybutylene glycol mono(meth)acrylate, poly(ethylene glycol-trimethylene glycol) mono(meth)acrylate, polyethylene glycol-polytrimethylene glycol mono(meth)acrylate, poly(propylene glycol-trimethylene glycol) mono(meth)acrylate, polypropylene glycol-polytrimethylene glycol mono(meth)acrylate, poly(trimethylene glycol-tetramethylene glycol) mono (meth)acrylate, polytrimethylene glycol-polytetramethylene glycol mono(meth)acrylate, poly(butylene glycol-trimethylene glycol) mono(meth)acrylate, and polybutylene glycol-polytrimethylene glycol mono(meth)acrylate. These monomers (B) can be used alone or in combination of two or more kinds thereof. The expression "poly(ethylene glycol-propylene glycol)" means a random copolymer of ethylene glycol and propylene glycol, the expression "polyethylene glycol-polypropylene glycol" means a block copolymer of ethylene glycol and propylene glycol, and the same applies to other expressions.

The copolymer (III-1) includes essential components which are the monomer (A) and the monomer (B) as raw materials, and a monomer (C) including an alkyl group may be used in combination as the other monomer. As the monomer (C), a monomer represented by the following General Formula (C-1) can be exemplified.

[Chem. 17]

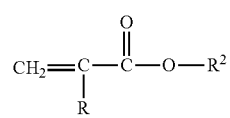

(C-1)

In the formula, $R^1$ represents a hydrogen atom or a methyl group, $R^2$ represents a linear, branched, or a cyclic alkyl group having 1 to 18 carbon atoms.

$R^2$ in General Formula (C-1) is a linear, branched, or cyclic alkyl group having 1 to 18 carbon atoms, and this alkyl group may include a substituent group such as an aliphatic or an aromatic hydrocarbon group or a hydroxyl group. Specific examples of an ethylenic unsaturated monomer including the alkyl group include alkyl ester having 1 to 18 carbon atoms of (meth)acrylic acid such as methyl (meth)acrylate, ethyl (meth)acrylate, (meth)acrylic acid propyl, (meth)acrylic acid butyl, (meth)acrylic acid octyl, (meth)acrylic acid-2-ethylhexyl, (meth)acrylic acid decyl, (meth)acrylic acid dodecyl, or (meth)acrylic acid stearyl; crosslinked cyclic alkyl ester having 1 to 18 carbon atoms of (meth)acrylic acid such as dicyclopentanyloxyl ethyl (meth) acrylate, isobornyloxyl ethyl (meth)acrylate, isobornyl (meth)acrylate, adamantyl (meth)acrylate, dimethyladamantyl (meth)acrylate, dicyclopentanyl (meth)acrylate, or dicyclopentenyl (meth)acrylate; and the like. These monomers (C) can be used alone or in combination of two or more kinds thereof.

In addition, as the raw materials of the fluorine-based surfactant of the present invention, aromatic vinyls such as styrene, α-methylstyrene, p-methylstyrene, or p-methoxystyrene; maleimides such as maleimide, methylmaleimide, ethylmaleimide, propylmaleimide, butylmaleimide, hexylmaleimide, octylmaleimide, dodecylmaleimide, stearylmaleimide, phenylmaleimide, or cyclohexylmaleimide; and the like can be used as monomers other than the monomer (A), the monomer (B), and the monomer (C).

In order to have excellent leveling properties of the fluorine-based surfactant of the present invention, a mass ratio [(A)/(B)] of the monomer (A) and the monomer (B) which are raw materials of the fluorine-based surfactant is preferably in a range of 10/90 to 70/30, more preferably in a range of 15/85 to 60/40, and even more preferably in a range of 25/75 to 50/50. In the case of using a monomer other than the monomer (A) and the monomer (B), the content thereof is preferably set to be equal to or smaller than 50% by mass with respect to the entire monomers.

Examples of the fluorine-based surfactant to be used in the present invention further include a copolymer (III-2) obtained by performing copolymerization using a polymerizable monomer (D) including a poly(perfluoroalkylene ether) chain and polymerizable unsaturated groups on both terminals thereof, and a polymerizable monomer including an oxyalkylene group and a polymerizable unsaturated group represented by General Formula (B), as essential monomers.

As the polymerizable monomer (D), a polymerizable monomer in which a divalent fluorocarbon group having 1 to 3 carbon atoms and an oxygen atom are coupled to each other can be exemplified. The divalent fluorocarbon group having 1 to 3 carbon atoms may be one kind or a mixture of the plural kinds, and specifically, the divalent fluorocarbon group represented by the following Structural Formula (a1) can be exemplified.

[Chem. 18]

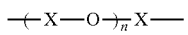
(a1)

In Structural Formula (a1), X is the following Structural Formulae (a1-1) to (a1-5), both Xs in Structural Formula (a1) may have the same structure, or a plurality of structures may be present randomly or in a block state. n is an integer equal to or greater than 1 representing a repeating unit number.

[Chem. 19]

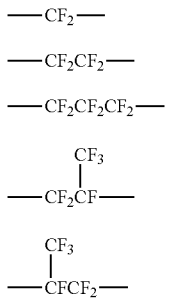

(a1-1)
(a1-2)
(a1-3)
(a1-4)
(a1-5)

Among these, in order to obtain a smooth coating film with excellent leveling properties of a coating composition including the fluorine-based surfactant of the present invention added thereto, a structure in which a perfluoromethylene structure represented by Structural Formula (a1-1) coexists with a perfluoroethylene structure represented by Structural Formula (a1-2) is particularly preferable. Herein, a presence ratio of the perfluoromethylene structure represented by Structural Formula (a1-1) and the perfluoroethylene structure represented by Structural Formula (a1-2) is preferably a ratio so that a mole fraction [structure (a1-1)/structure (a1-2)] is from 1/10 to 10/1, from a viewpoint of the leveling properties, and a value of n in Structural Formula (a1) is preferably in a range of 3 to 100 and particularly preferably in a range of 6 to 70.

In addition, regarding the poly(perfluoroalkylene ether) chain, the total number of fluorine atoms contained in one poly(perfluoroalkylene ether) chain is preferably in a range of 18 to 200 and more preferably in a range of 25 to 150, in order to satisfy both of the leveling properties of the coating composition and solubility of the coating composition in non-fluorine-based materials.

As a compound before introducing polymerizable unsaturated groups to both terminals, which is a raw material of the polymerizable monomer (D), the following General Formulae (a2-1) to (a2-6) are used. "—PFPE—" in each of the following structural formulae represents the poly(perfluoroalkylene ether) chain.

[Chem. 20]

(a2-1)
(a2-2)
(a2-3)
(a2-4)
(a2-5)
(a2-6)

Examples of the polymerizable unsaturated groups included in both terminals of the poly(perfluoroalkylene ether) chain of the polymerizable monomer (D) include polymerizable unsaturated groups represented by the following Structural Formulae U-1 to U-5.

[Chem. 21]

U-1
U-2
U-3
U-4
U-5

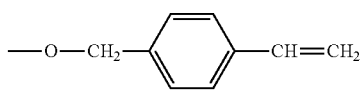

Among these polymerizable unsaturated groups, an acryloyloxy group represented by Structural Formula U-1 or a methacryloyloxy group represented by Structural Formula U-2 is particularly preferable from viewpoints of availability or manufacturability of the polymerizable monomer (D), or copolymerizability with the polymerizable monomer (B).

In the present invention, a "(meth)acryloyl group" means one or both of a methacryloyl group and an acryloyl group, "(meth)acrylate" means one or both of methacrylate and acrylate, and "(meth)acrylic acid" means one or both of methacrylic acid and acrylic acid.

Specific examples of the polymerizable monomer (D) include polymerizable monomers represented by Structural Formulae (D-1) to (D-13). "—PFPE-" in each of the following structural formulae represents the poly(perfluoroalkylene ether) chain.

erizable monomer including an acryloyl group in both terminals of the poly(perfluoroalkylene ether) chain represented by Structural Formula (D-1) or a polymerizable monomer including a methacryloyl group in both terminals of the poly(perfluoroalkylene ether) chain represented by

[Chem. 22]

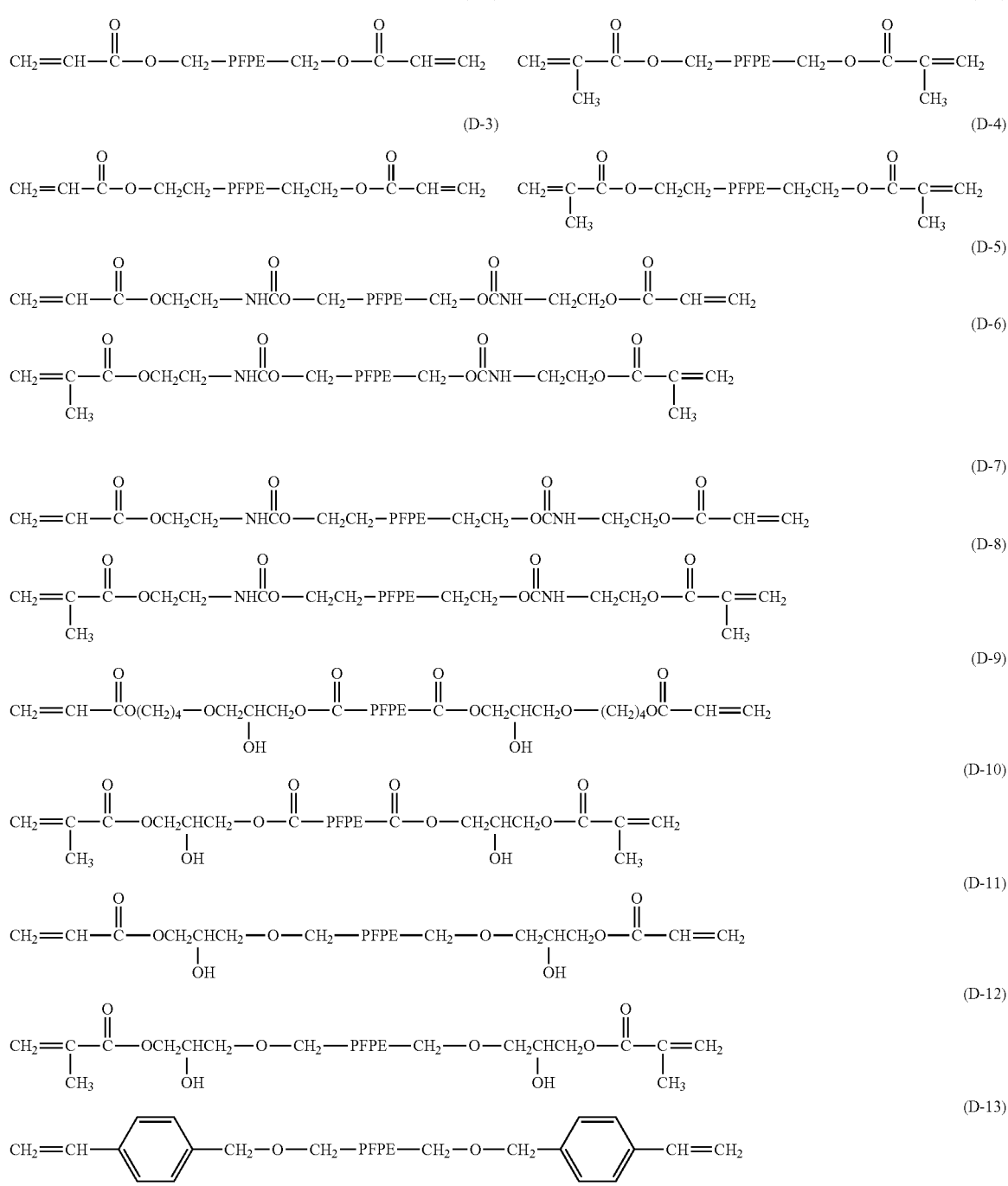

Among these, polymerizable monomers represented by Structural Formulae (D-1), (D-2), (D-5), and (D-6) are preferable, because the industrial manufacturing of the polymerizable monomer (D) is easily performed. A polym- Structural Formula (D-2) is more preferable, because it is possible to further improve performance of a levelling agent.

In the copolymer (III-2), the same monomer as the monomer represented by General Formula (B) can be used as the monomer including the oxyalkylene group and the polymerizable unsaturated group as essential components.

The copolymer (III-2) includes essential components which are the monomer (A) and the monomer (B) as raw materials, and the monomer (C) including an alkyl group may be used in combination as the other monomer. As the monomer (C), the monomer represented by General Formula (C-1) can be exemplified.

In addition, aromatic vinyls such as styrene, α-methylstyrene, p-methylstyrene, or p-methoxystyrene; maleimides such as maleimide, methylmaleimide, ethylmaleimide, propylmaleimide, butylmaleimide, hexylmaleimide, octylmaleimide, dodecylmaleimide, stearylmaleimide, phenylmaleimide, or cyclohexylmaleimide; and the like can be used as monomers other than the monomer (A), the monomer (B), and the monomer (C). Further, a polymerizable monomer including a fluorinated alkyl group having 1 to 6 carbon atoms may be used.

As an example of the compound (III), a compound represented by the following General Formula (III-3) can be further exemplified.

[Chem. 23]

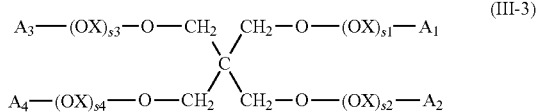

(III-3)

In the formula, OX represents an alkylene group, s1 represents a numerical value of 1 to 80, s2 to s4 are the same as each other or different from each other and represent a numerical value of 0 to 79, and a value of s1+s2+s3+s4 is a numerical value of 4 to 80, $A_1$ represents a fluoroalkyl group or a fluoroalkenyl group, and $A_2$ to $A_4$ are the same as each other or different from each other and represent a hydrogen, a fluoroalkyl group or a fluoroalkenyl group.

In General Formula (III-3), B represents an alkylene group, and is preferably an ethylene group or a propylene group, more preferably an ethylene group.

In General Formula (III-3), s1 represents a numerical value of 1 to 80, s2 to s4 are the same as each other or different from each other and represent numerical value of 0 to 79, and a value of s1+s2+s3+s4 is a numerical value of 4 to 80, is preferably 4 to 40 and particularly preferably 4 to 30.

In General Formula (III-3), $A_1$ represents a linear or branched fluoroalkyl group or fluoroalkenyl group having 3 to 12 carbon atoms, $A_2$ to $A_4$ are the same as each other or different from each other and represent a hydrogen, a linear or branched fluoroalkyl group or fluoroalkenyl group having 3 to 12 carbon atoms, and $A_1$ to $A_4$ are preferably a fluoroalkenyl group and particularly preferably a branched fluorononenyl group.

As an example of General Formula (III-3), a compound represented by the following General Formula (III-3-1) can be further exemplified.

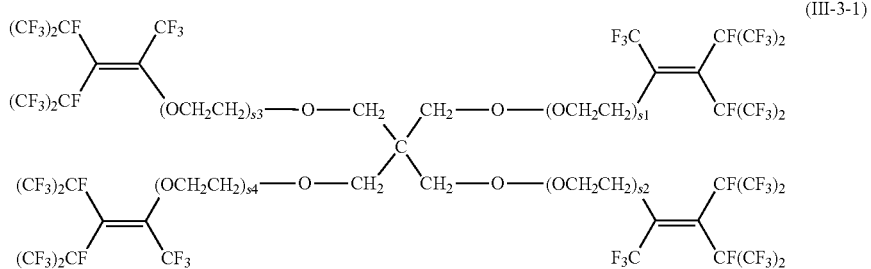

(III-3-1)

In the formula, s1 represents a numerical value of 1 to 80, s2 to s4 are the same as each other or different from each other and represent a numerical value of 0 to 79, and a value of s1+s2+s3+s4 is a numerical value of 4 to 80.

(Other Liquid Crystal Compounds)

Liquid crystal compounds not including a polymerizable group may be added to the polymerizable liquid crystal composition of the present invention, if necessary. However, when an added amount thereof is excessively great, the liquid crystal compounds may be eluted from the obtained anisotropic optical body to cause contamination of the laminated member and heat resistance of the anisotropic optical body may be decreased, and therefore, in the case of adding the liquid crystal compounds, the content thereof is preferably equal to or smaller than 30% by mass, more preferably equal to or smaller than 15% by mass, and particularly preferably equal to or smaller than 5% by mass, with respect to the entire content of the polymerizable liquid crystal compound.

(Polymerization Initiator)

The polymerizable liquid crystal composition of the present invention preferably contains at least one or more kinds of a polymerization initiator such as a thermal polymerization initiator or a photopolymerization initiator. Examples of the thermal polymerization initiator include benzoyl peroxide and 2,2'-azobisisobutyronitrile. Examples of the photopolymerization initiator include benzoin ethers, benzophenones, acetophenones, benzylketals, and thioxanthones. Specific examples thereof include "Irgacure 651", "Irgacure 184", "Irgacure 907", "Irgacure 127", "Irgacure 369", "Irgacure 379", "Irgacure 819", "Irgacure OXE01", "Irgacure OXE02", "Lucirin TPO", and "Darocur 1173" manufactured by BASF, "Esacure 1001M", "Esacure KIP150", "Speedcure BEM", "Speedcure BMS", "Speedcure PBZ", and "benzophenone" manufactured by LAMBSON, and the like. In addition, as a photocationic initiator, a photoacid generator can be used. As the photoacid generator, diazodisulfone-based compound, triphenylsulfonium-based compound, phenyl sulfone-based compound, sulfonyl pyridine-based compound, a triazine-based compound, and a diphenyliodonium compound are suitably used.

The amount of the photopolymerization initiator used is preferably 0.1% to 10% by mass and particularly preferably 0.5% to 5% by mass with respect to the polymerizable liquid crystal composition. These can be used alone or in combination of two or more kinds thereof, and a sensitizer or the like may be added thereto.

The polymerizable liquid crystal composition of the present invention may include a compound which has a polymerizable group and is not a polymerizable liquid crystal compound. Such a compound can be used without any particular limitations, as long as the compound is generally recognized as a polymerizable monomer or a polymerizable oligomer in this technical field. In the case of adding the compound, the content thereof is preferably equal to or smaller than 15% by mass and more preferably equal to or smaller than 10% by mass, with respect to the total content of the polymerizable compound and the chiral compound used in the polymerizable liquid crystal composition of the present invention.

(Optically Active Compound)

The polymerizable liquid crystal composition of the present invention may include an optically active compound, that is, a chiral compound. It is not necessary that the chiral compound shows a liquid crystal phase, and the chiral compound may or may not include a polymerizable group. In addition, a helical direction of the chiral compound can be suitably selected depending on the purpose of use of the polymer.

Specific examples thereof include cholesterol pelargonate or cholesterol stearate including a cholesteryl group as a chiral group, "CB-15" or "C-15" manufactured by BDH Chemicals Ltd., "S-1082" manufactured by Merck KGaA, or "CM-19", "CM-20", or "CM" manufactured by The Chisso Corporation including a 2-methylbutyl group as a chiral group, and "S-811" manufactured by Merck KGaA, or "CM-21" or "CM-22" manufactured by The Chisso Corporation including a 1-methylheptyl group as a chiral group.

In the case of adding the chiral compound, it is preferable to add the amount thereof so that a value (d/P) obtained by dividing a thickness (d) of the obtained polymer by a helical pitch (P) in the polymer is in a range of 0.1 to 100 and it is more preferable to add the amount thereof so that the value (d/P) is in a range of 0.1 to 20, although it depends on the purpose of the polymer of the polymerizable liquid crystal composition of the present invention.

(Other Compounds)

The polymerizable liquid crystal composition of the present invention may contain at least one or more kinds of a compound which has a repeating unit and a weight average molecular weight equal to or greater than 100 and is represented by the following General Formula (3), in order to effectively decrease a tilt angle of an air interface, in the case where the anisotropic optical body is obtained.

[Chem. 25]

(3)

In the formula, $R^{36}$, $R^{37}$, $R^{38}$, and $R^{39}$ each independently represent a hydrogen atom, a halogen atom, or a hydrocarbon group having 1 to 20 carbon atoms, the hydrogen atoms in the hydrocarbon group may be substituted with one or more halogen atoms.

Examples of preferred compounds represented by General Formula (3) include polyethylene, polypropylene, polyisobutylene, paraffin, liquid paraffin, chlorinated polypropylene, chlorinated paraffin, and chlorinated liquid paraffin.

The added amount of the compound represented by General Formula (3) is preferably 0.01% to 1% by mass and more preferably 0.05% to 0.5% by mass with respect to the polymerizable liquid crystal composition.

(Chain Transfer Agent)

The polymerizable liquid crystal composition of the present invention also preferably includes a chain transfer agent, in order to further improve adhesiveness with a base material in the case where the anisotropic optical body is obtained. As the chain transfer agent, a thiol compound is preferable, monothiol, dithiol, trithiol, tetrathiol compounds are more preferable, and a trithiol compound and a tetrathiol compound are even more preferable. Specifically, compounds represented by the following General Formulae (4-1) to (4-12) are preferable.

[Chem. 26]

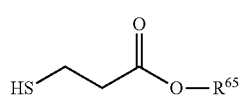 (4-1)

 (4-2)

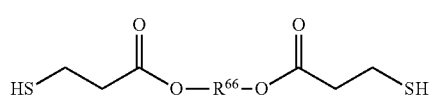 (4-3)

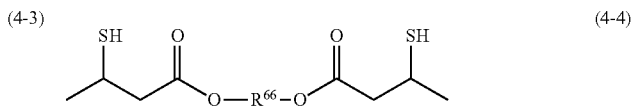 (4-4)

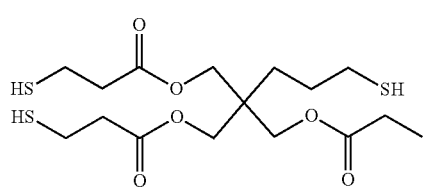 (4-5)

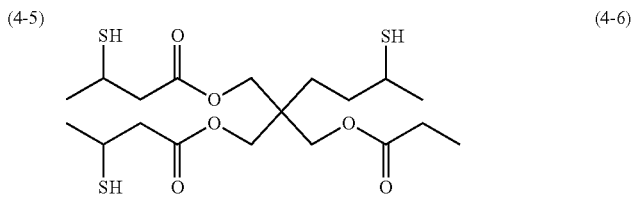 (4-6)

-continued

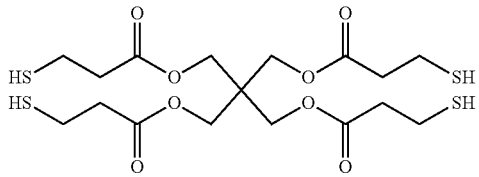
(4-7)

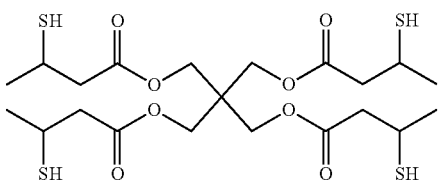
(4-8)

[Chem. 27]

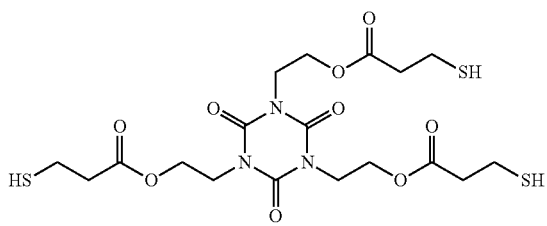
(4-9)

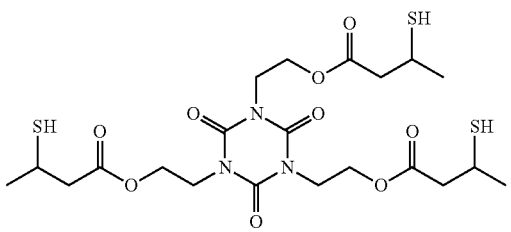
(4-10)

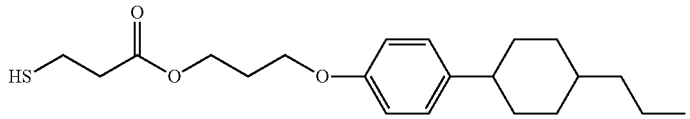
(4-11)

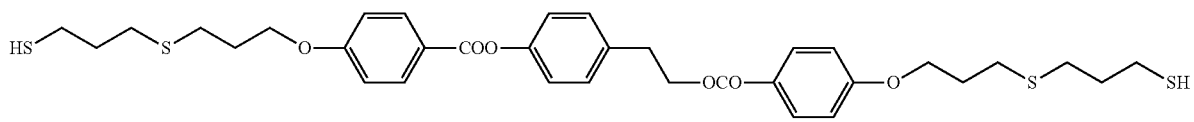
(4-12)

In the formulae, $R^{65}$ represents an alkyl group having 2 to 18 carbon atoms, the alkyl group may be linear or branched, one or more methylene groups in the alkyl group may be substituted with oxygen atoms, sulfur atoms, —CO—, —OCO—, —COO—, or —CH═CH—, in a state where oxygen atoms and sulfur atoms are not directly bonded to each other, $R^{66}$ represents an alkylene group having 2 to 18 carbon atoms, one or more methylene groups in the alkylene group may be substituted with oxygen atoms, sulfur atoms, —CO—, —OCO—, —COO—, or —CH═CH—, in a state where oxygen atoms and sulfur atoms are not directly bonded to each other.

The added amount of the thiol compound is preferably 0.5% to 10% by mass and more preferably 1.0% to 5.0% by mass with respect to the polymerizable composition.

(Other Additives)

A polymerization inhibitor, an antioxidant or the like is also preferably added, in order to increase solution stability of the polymerizable liquid crystal composition of the present invention. Examples of such compounds include a hydroquinone derivative, a nitrosamine-based polymerization inhibitor, and a hindered phenol-based antioxidant, and more specific examples thereof include p-methoxyphenol, tert-butylhydroquinone, methylhydroquinone, "Q-1300" and "Q-1301" manufactured by Wako Pure Chemical Industries, Ltd., "IRGANOX1010", "IRGANOX1035", "IRGANOX1076", "IRGANOX1098", "IRGANOX1135", "IRGANOX1330", "IRGANOX1425", "IRGANOX1520", "IRGANOX1726", "IRGANOX245", "IRGANOX259", "IRGANOX3114", "IRGANOX3790", "IRGANOX5057", or "IRGANOX565" manufactured by BASF.

The added amount of the polymerization inhibitor and the antioxidant is preferably 0.01% to 1.0% by mass and more preferably 0.05% to 0.5% by mass with respect to the polymerizable liquid crystal composition.

In the case of using the polymerizable liquid crystal composition of the present invention as a raw material of a polarizing film or an oriented film, a printing ink and a paint, or a protecting film, a metal, a metal complex, a dye, a pigment, a fluorescent material, a phosphorescent material, a thixotropic agent, a gelling agent, polysaccharides, an ultraviolet absorber, an infrared absorber, or an antioxidant, a ion-exchange resin, or metal oxide such as titanium oxide may be added according to the purpose.

(Organic Solvent)

An organic solvent used in the polymerizable liquid crystal composition of the present invention is not particularly limited, and a solvent in which the polymerizable compound excellently dissolves is preferable and a solvent which can be dried at a temperature equal to or lower than 100° C. is preferable. Examples of such a solvent include aromatic hydrocarbon-based solvent such as toluene, xylene, cumene, or mesitylene, an ester-based solvent such as methyl acetate, ethyl acetate, propyl acetate, or butyl acetate, a ketone-based solvent such as methyl ethyl ketone, methyl isobutyl ketone, cyclohexanone, or cyclopentanone, ether-based solvent such as tetrahydrofuran, 1,2-dimethoxy ethane, or anisole, an amide-based solvent such as N,N-dimethylformamide or N-methyl-2-pyrrolidone, propylene glycol monomethyl ether acetate, diethylene glycol monomethyl ether acetate, γ-butyrolactone, and chlorobenzene. These can be used alone or in combination of two or more kinds thereof, and it is preferable to use any one or more kinds from a ketone-based solvent, an ether-based solvent, an ester-based solvent, and an aromatic hydrocarbon-based solvent, and in the case of using these in combination of two kinds, it is preferable to mix and use any one kind from a ketone-based solvent and an ester-based solvent, from a viewpoint of solution stability.

Since the polymerizable liquid crystal composition used in the present invention is generally obtained by coating, the rate of the organic solvent in the polymerizable liquid crystal composition is not particularly limited as long as it does not significantly damage the coated state, and a solid content of the polymerizable liquid crystal composition is preferably 10% to 60% by mass and more preferably 20% to 50% by mass.

(Manufacturing Method of Anisotropic Optical Body)

(Anisotropic Optical Body)

The anisotropic optical body of the present invention is obtained by applying the polymerizable liquid crystal composition of the present invention onto a substrate material having an orientation function, allowing liquid crystal molecules in the polymerizable liquid crystal composition of the present invention to be evenly oriented in a state of maintaining a nematic phase, and performing polymerization.

(Substrate Material)

The substrate material used in the anisotropic optical body of the present invention is a substrate material which is generally used in a liquid crystal device, a display, an optical component, or an optical film, and is not particularly limited, as long as it is a material having heat resistance so as to withstand the heating at the time of drying after applying the polymerizable composition solution of the present invention. As the substrate material, an organic material such as a glass substrate material, a metal substrate material, a ceramic substrate material, or a plastic substrate material can be exemplified. Particularly, in the case where the substrate material is an organic material, examples thereof include cellulose derivative, polyester, polyolefin, polycarbonate, polyacrylate, polyarylate, polyether sulfone, polyimide, polyphenylene sulfide, polyphenylene ether, nylon, and polystyrene. Among these, a plastic substrate material such as polyester, polystyrene, polyolefin, cellulose derivative, polyarylate, or polycarbonate is preferable. The shape of the substrate material may have a curved surface, in addition to a flat plate. These substrate materials may include an electrode layer and have an antireflection function or a reflection function, if necessary.

The surface treatment of these substrate materials may be performed, in order to improve coating properties or adhesiveness of the polymerizable liquid crystal composition of the present invention. As the surface treatment, ozone treatment, plasma treatment, corona treatment, silane coupling treatment, and the like are used. In addition, in order to adjust transmittance or reflectance of light, an organic thin film, an inorganic oxide thin film, or a metal thin film may be provided on the surface of the substrate material by vapor deposition, or in order to provide an optically added value, the substrate material may be a pickup lens, a rod lens, an optical disk, a retardation film, a light diffusing film, or a color filter. Among these, a pickup lens, a retardation film, alight diffusing film, and a color filter are preferable so as to further increase the added value.

(Orientation Treatment)

The substrate material is generally subjected to orientation treatment or an oriented film may be provided thereon, in order to allow the polymerizable composition to be oriented when the polymerizable composition solution of the present invention is applied and dried. Examples of the orientation treatment include stretching treatment, rubbing treatment, polarized light ultraviolet-visible light irradiation treatment, ion beam treatment, and oblique vapor deposition treatment of $SiO_2$ on a substrate material. In the case of using an oriented film, a well-known commonly used oriented film can be used. Examples of such an oriented film include compounds such as polyimide, polysiloxane, polyamide, polyvinyl alcohol, polycarbonate, polystyrene, polyphenylene ether, polyarylate, polyethylene terephthalate, polyether sulfone, an epoxy resin, an epoxyacrylate resin, an acrylic resin, a coumarin compound, a chalcone compound, a cinnamate compound, a fulgide compound, an anthraquinone compound, an azo compound, and an arylethene compound. As a compound to be subjected to the orientation treatment by rubbing, it is preferable to use a compound in which crystallization of the material is promoted by the orientation treatment or by adding a heating step after the orientation treatment. Among compounds to be subjected to the orientation treatment other than the rubbing, it is preferable to use a photo-orientation material.

In general, in the case where the liquid crystal composition is brought to come into contact with a substrate having an orientation function, the liquid crystal molecules are oriented in the vicinity of the substrate along a direction in which the orientation treatment of the substrate is performed. The method of performing the orientation treatment of the substrate significantly affects to the state whether the liquid crystal molecules are oriented to be horizontal to the substrate or oriented to be inclined or vertical to the substrate. For example, when an oriented film having an extremely small pretilt angle which is used in a liquid crystal display element in an in-plane switching (IPS) system is provided on the substrate, a polymerizable liquid crystal layer in which the liquid crystal molecules are horizontally oriented is obtained in many cases.

In the case where an oriented film which is used in a TN-type liquid crystal display element is provided on the substrate, a polymerizable liquid crystal layer having slightly inclined orientation is obtained, and when an oriented film which is used in a STN-type liquid crystal display element is used, a polymerizable liquid crystal layer having largely inclined orientation is obtained.

When the liquid crystal composition is brought to come into contact with the substrate having a horizontal orientation (approximately horizontal orientation) function with an extremely small pretilt angle, the liquid crystal molecules in the composition accurately horizontally oriented in the vicinity of the substrate, but an orientation restricting force is not smoothly transmitted thereto in the vicinity of the air interface, and therefore, the orientation is partially disturbed (this is orientation defects). However, in the polymerizable liquid crystal composition of the present invention containing a copolymer (S), the copolymer (S) is unevenly distributed in the vicinity of the air interface to allow the liquid crystal molecules in the vicinity of the air interface to be oriented, without disturbing the orientation restricting force on the substrate side applied to the liquid crystal molecules in the polymerizable liquid crystal composition, and therefore, it is considered that it is possible to obtain an anisotropic optical body having great optical anisotropy with even orientation without any orientation defects.

(Coating)

Examples of the coating method for obtaining the anisotropic optical body of the present invention include well-known commonly used methods such as an applicator method, a bar coating method, a spin-coating method, a roll coating method, a direct gravure coating method, a reverse gravure coating method, a flexographic coating method, an ink jet method, a die coating method, a cap coating method, a dip coating method, and a slit coating method. The polymerizable liquid crystal composition is coated and then dried.

It is preferable that the liquid crystal molecules in the polymerizable liquid crystal composition of the present invention are allowed to be evenly oriented in a state of maintaining a nematic phase, after being coating. Specifically, it is preferable to perform thermal treatment for promoting orientation of the liquid crystal, because the copolymer (S) is more unevenly distributed on the surface and the orientation is further promoted. As the thermal treatment method, for example, the polymerizable liquid crystal composition of the present invention is applied onto the substrate and heated at a temperature equal to or higher than a N (nematic phase)-I (isotropic liquid phase) transition temperature (hereinafter, abbreviated as an N-I transition temperature) of the liquid crystal composition, and the liquid crystal composition is set in an isotropic liquid state. Then, as necessary, the liquid crystal composition is slowly cooled to express the nematic phase. At that time, it is desirable that the temperature is temporarily maintained at a temperature to form the liquid crystal phase and the liquid crystal phase domain is allowed sufficiently grow to have a monodomain. Alternatively, after applying the polymerizable liquid crystal composition of the present invention onto the substrate, heating treatment of maintaining the temperature in a temperature range in which the nematic phase of the polymerizable liquid crystal composition of the present invention is expressed, for the certain time may be performed.

When the heating temperature is excessively high, an unpreferred polymerization reaction of the polymerizable liquid crystal compound may occur to cause deterioration. In addition, when the temperature is excessively low, phase separation of the polymerizable liquid crystal composition may occur to cause precipitation of liquid crystals and express a higher-order liquid crystal phase such as a smectic phase, and the orientation treatment may not be performed.

By performing such thermal treatment, it is possible to manufacture a homogeneous anisotropic optical body with less orientation defects, compared to the case of the coating method of simply coating.

In addition, when cooling is performed to the lowest temperature at which the phase separation of the liquid crystal phase does not occur, that is, a temperature at which the state becomes a supercooled state, after performing the homogeneous orientation treatment as described above, and the polymerization is performed in a state where the liquid crystal phase is oriented at that temperature, it is possible to obtain an anisotropic optical body having higher orientational order and excellent transparency.

(Polymerization Step)

The polymerization treatment of the dried polymerizable composition is generally performed by light irradiation such as ultraviolet light or heating in a planar oriented state. In the case of performing the polymerization by light irradiation, specifically, it is preferable to emit ultraviolet light having a wavelength equal to or smaller than 390 nm and it is most preferable to emit light having a wavelength of 250 nm to 370 nm. However, in the case where the polymerizable composition causes decomposition or the like due to the ultraviolet light having a wavelength equal to or smaller than 390 nm, the polymerizable treatment may be preferably performed with ultraviolet light having a wavelength equal to or greater than 390 nm. This light is preferably diffuse light and unpolarized light.

(Polymerization Method)

A method of emitting active energy rays or a thermal polymerization method can be exemplified as a method of polymerizing the polymerizable liquid crystal composition of the present invention, but the method of emitting active energy rays is preferable, because the reaction proceeds at room temperature without the necessities of the heating, and among the methods, a method of emitting light such as ultraviolet rays is preferable, from a viewpoint of a simple operation. It is preferable that a temperature at the time of emission is set as a temperature at which the polymerizable liquid crystal composition of the present invention can maintain the liquid crystal phase and is equal to or lower than 30° C. as possible, in order to avoid evocation of the thermal polymerization of the polymerizable liquid crystal composition. The liquid crystal composition generally shows liquid crystal phases in a range of a C (solid phase)-N(nematic) transition temperature (hereinafter, abbreviated as a C-N transition temperature) to the N-I transition temperature in the heating process. Meanwhile, in the cooling process, the liquid crystal state may be maintained even at a temperature equal to or lower than the C-N transition temperature, without performing solidification, in order to acquire a thermodynamically nonequilibrium state. This state is called a supercooled state. In the present invention, the liquid crystal composition in the supercooled state is also included as the liquid crystal composition maintaining the liquid crystal phase. Specifically, it is preferable to emit ultraviolet light having a wavelength equal to or smaller than 390 nm and it is most preferable to emit light having a wavelength of 250 nm to 370 nm. However, in the case where the polymerizable composition causes decomposition or the like due to the ultraviolet light having a wavelength equal to or smaller than 390 nm, the polymerizable treatment may be preferably performed with ultraviolet light having a wavelength equal to or greater than 390 nm. This light is preferably diffuse light and unpolarized light. The irradiation intensity of ultraviolet light is preferably in a range of 0.05 $kW/m^2$ to 10 $kW/m^2$. The irradiation intensity of ultraviolet light is particularly preferably in a range of 0.2 $kW/m^2$ to 2 $kW/m^2$. When the irradiation intensity of ultraviolet light is less than 0.05 $kW/m^2$, a considerable time is taken for completing the polymerization. Meanwhile, in the case of the intensity exceeding 2 $kW/m^2$, photolysis of the liquid crystal molecules in the polymerizable liquid crystal composition tends to occur, or the temperature during the polymerization may be increased due to generation of a considerable amount of heat of polymerization, an order parameter of the polymerizable liquid crystals may change, and the disorder may occur in the retardation of the polymerized film.

When a specific portion is only polymerized by the irradiation of ultraviolet light using a mask, then, the orientation state of the unpolymerized portion is changed by applying an electric filed, a magnetic field, or a temperature, and then, the unpolymerized portion is polymerized, it is possible to obtain an anisotropic optical body having a plurality of regions having different orientation directions.

In addition, it is also possible to obtain an anisotropic optical body having a plurality of regions having different orientation directions, by regulating the orientation by applying an electric filed, a magnetic field, or a temperature to the polymerizable liquid crystal composition in the unpolymerized state in advance, when polymerizing only the specific portion by the irradiation of ultraviolet light sing a mask, and then, performing the polymerization by emitting light to the mask while maintaining the state described above.

The anisotropic optical body obtained by polymerizing the polymerizable liquid crystal composition of the present invention can be used as a single body of the anisotropic optical body by being separated from the substrate or can be used as the anisotropic optical body as it is without being separated from the substrate. Particularly, it is useful to use the anisotropic optical body as a laminated substrate or use the anisotropic optical body by bonding the anisotropic optical body to another substrate, because the anisotropic optical body hardly contaminates other members.

EXAMPLES

Hereinafter, the present invention will be described with reference to synthesis examples, examples, and comparative example, but the present invention is not limited thereto. Unless otherwise noted, "part" and "go" are based on mass.

(Preparation of Polymerizable Liquid Crystal Composition (1))

34 parts of a compound represented by Formula (A-1), 10 parts of a compound represented by Formula (A-2), 28 parts of a compound represented by Formula (B-1), 28 parts of a compound represented by Formula (B-2), 0.1 parts of a compound represented by Formula (E-1), 0.1 parts of a compound represented by Formula (G-1), 6 parts of a compound represented by Formula (I-1), and 0.2 parts of a compound represented by Formula (H-1) which is a surfactant were stirred in 300 parts of methyl isobutyl ketone (D-1) which is an organic solvent using a stirring device including stirring propellers under the conditions in which a stirring rate is 500 rpm and a solution temperature is 80° C., for 1 hour, and then filtrated using a membrane filter having an aperture of 0.2 μm, to obtain a polymerizable liquid crystal composition (1).

(Preparation of Polymerizable Liquid Crystal Compositions (2) to (24) and Comparative Polymerizable Liquid Crystal Compositions (25) and (26))

In the same manner as in the preparation of the polymerizable liquid crystal composition (1) of the present invention, the compounds represented by Formula (A-1) to Formula (C-6) and Formula (E-1) to Formula (I-6) shown in Table 1 or Table 2 were stirred in 300 parts of methyl isobutyl ketone (D-1) which is an organic solvent using a stirring device including stirring propellers under the conditions in which a stirring rate is 500 rpm and a solution temperature is 80° C., for 1 hour, and then filtrated using a membrane filter having an aperture of 0.2 μm, to obtain polymerizable liquid crystal compositions (2) to (24) and comparative polymerizable liquid crystal compositions (25) and (26).

Table 1 and Table 2 show specific compositions of the polymerizable liquid crystal compositions (1) to (24) of the present invention and comparative polymerizable liquid crystal compositions (25) and (26).

TABLE 1

| solution | (1) | (2) | (3) | (4) | (5) | (6) | (7) | (8) | (9) | (10) | (11) | (12) | (13) | (14) |
|---|---|---|---|---|---|---|---|---|---|---|---|---|---|---|
| (A-1) | 34 | 34 | 34 | 34 | 34 | | 40 | 11 | 21 | 21 | 21 | 21 | 30 | 12 |
| (A-2) | 10 | 10 | 10 | 10 | 10 | 32 | 10 | 19 | 23 | 23 | 23 | 23 | | 3 |
| (B-1) | 28 | 28 | 28 | 28 | 28 | 28 | 25 | 26 | 21 | 21 | 21 | 21 | 30 | |
| (B-2) | 28 | 28 | 28 | 28 | 28 | 12 | 25 | 27 | | | | | | |
| (B-3) | | | | | | 28 | | | 35 | 35 | 35 | 35 | 40 | 12 |
| (B-4) | | | | | | | | | | | | | | 70 |
| (B-5) | | | | | | | | | | | | | | |
| (B-6) | | | | | | | | 8.5 | | | | | | |
| (B-7) | | | | | | | | 8.5 | | | | | | |
| (C-1) | | | | | | | | | | | | | | 3 |
| (C-2) | | | | | | | | | | | | | | |
| (C-3) | | | | | | | | | | | | | | |
| (C-4) | | | | | | | | | | | | | | |
| (D-1) | 300 | 300 | 300 | 300 | 300 | 300 | 300 | 300 | 300 | 300 | 300 | 300 | 300 | 300 |
| (E-1) | 0.1 | 0.1 | 0.1 | 0.1 | 0.1 | 0.1 | 0.1 | 0.1 | 0.1 | 0.1 | 0.1 | 0.1 | 0.1 | 0.1 |
| (F-1) | | | | | | | | | 0.1 | 0.1 | 0.1 | 0.1 | | |
| (G-1) | 6 | 6 | 6 | 6 | 4 | 6 | | | 6 | 6 | 6 | 6 | 7 | 6 |
| (G-2) | | | | | | | 1 | 1 | | | | | | |
| (G-3) | | | | 1 | | | | | | | | | | |
| (G-4) | | | | | | | | | | | | | | |
| (G-5) | | | | | | | | | | | | | | |
| (H-1) | 0.2 | | | | 0.2 | 0.2 | 0.2 | 0.2 | 0.1 | | | | 0.01 | 0.01 |
| (H-2) | | 0.2 | | | | | | | | 0.1 | | | | |
| (H-3) | | | 0.2 | | | | | | | | 0.1 | | | |
| (H-4) | | | | 0.2 | | | | | | | | 0.1 | | |
| (H-5) | | | | | | | | | | | | | | |
| (H-6) | | | | | | | | | | | | | | |
| (H-7) | | | | | | | | | | | | | | |
| (H-8) | | | | | | | | | | | | | | |
| (H-9) | | | | | | | | | | | | | | |

TABLE 2

| solution | (15) | (16) | (17) | (18) | (19) | (20) | (21) | (22) | (23) | (24) | (25) | (26) |
|---|---|---|---|---|---|---|---|---|---|---|---|---|
| (A-1) | | 57 | 47.5 | 34 | 34 | 21 | 30 | 12 | | 34 | 34 | 34 |
| (A-2) | 21 | 13 | | 10 | 10 | 23 | | 3 | 21 | 10 | 10 | 10 |
| (B-1) | | 9 | 2.5 | 28 | 28 | 21 | 30 | | | 28 | 28 | 28 |
| (B-2) | | 21 | 8 | 28 | 28 | | | | 8 | 28 | 28 | 28 |
| (B-3) | 8 | | | | | 35 | 40 | 12 | | | | |
| (B-4) | | | | | | | | 70 | | | | |

TABLE 2-continued
| solution | (15) | (16) | (17) | (18) | (19) | (20) | (21) | (22) | (23) | (24) | (25) | (26) |
|---|---|---|---|---|---|---|---|---|---|---|---|---|
| (B-5) |  |  | 31.5 |  |  |  |  |  |  |  |  |  |
| (B-6) |  |  |  |  |  |  |  |  |  |  |  |  |
| (B-7) |  |  |  |  |  |  |  |  |  |  |  |  |
| (C-1) |  |  |  |  |  |  |  | 3 |  |  |  |  |
| (C-2) | 5 |  |  |  |  |  |  |  |  | 5 |  |  |
| (C-3) | 66 |  |  |  |  |  |  |  |  | 66 |  |  |
| (C-4) |  |  | 10.5 |  |  |  |  |  |  |  |  |  |
| (D-1) | 300 | 300 | 300 | 300 | 300 | 300 | 300 | 300 | 300 | 300 | 300 | 300 |
| (E-1) | 0.1 | 0.1 | 0.1 | 0.1 | 0.1 | 0.1 | 0.1 | 0.1 | 0.1 | 0.1 | 0.1 | 0.1 |
| (F-1) |  |  |  |  |  | 0.1 |  |  |  |  |  |  |
| (G-1) |  |  |  | 6 | 6 | 6 | 7 | 6 |  | 6 | 6 | 6 |
| (G-2) |  |  |  |  |  |  |  |  |  |  |  |  |
| (G-3) |  |  |  |  |  |  |  |  |  |  |  |  |
| (G-4) | 2 |  |  |  |  |  |  |  | 2 |  |  |  |
| (G-5) | 2 | 2 | 4 |  |  |  |  |  | 2 |  |  |  |
| (H-1) | 0.2 | 0.2 | 0.2 |  |  |  |  |  |  |  |  |  |
| (H-2) |  |  |  |  |  |  |  |  |  |  |  |  |
| (H-3) |  |  |  |  |  |  |  |  |  |  |  |  |
| (H-4) |  |  |  |  |  |  |  |  |  |  |  |  |
| (H-5) |  |  |  | 0.2 |  | 0.1 | 0.01 | 0.01 | 0.2 |  |  |  |
| (H-6) |  |  |  |  | 0.2 |  |  |  |  |  |  |  |
| (H-7) |  |  |  |  |  |  |  |  |  | 0.05 |  |  |
| (H-8) |  |  |  |  |  |  |  |  |  |  | 0.2 |  |
| (H-9) |  |  |  |  |  |  |  |  |  |  |  | 0.2 |
[Chem. 28]
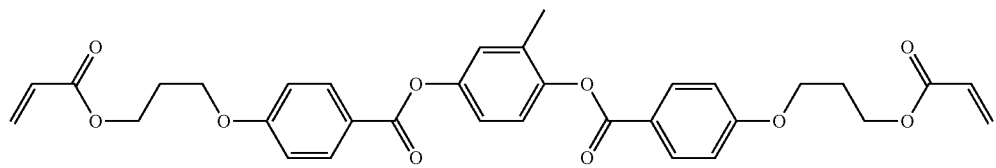
(A-1)
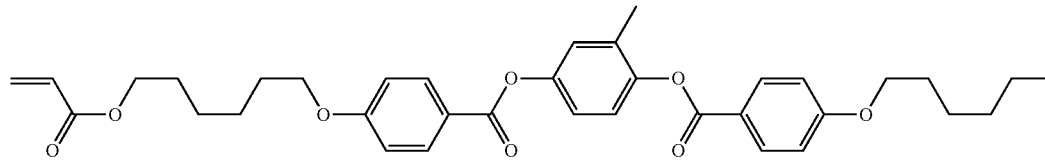
(A-2)
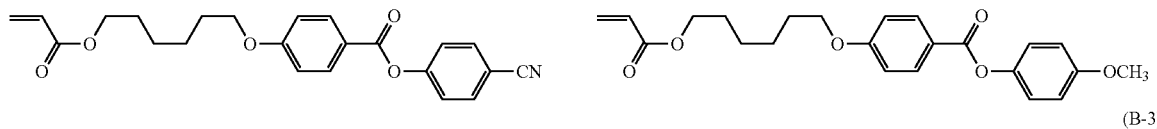
(B-1)  (B-2)
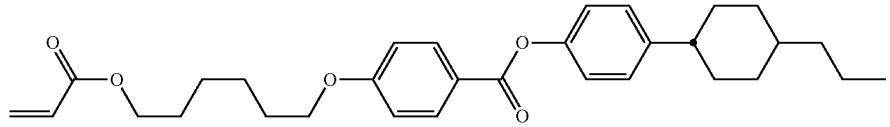
(B-3)
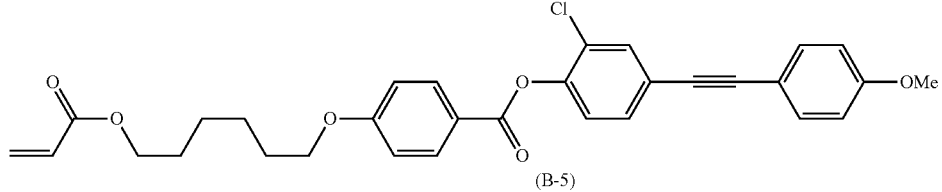
(B-4)
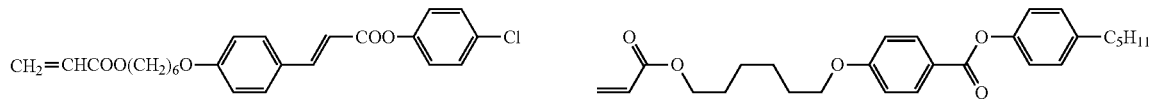
(B-5)  (B-6)

-continued
(B-7)
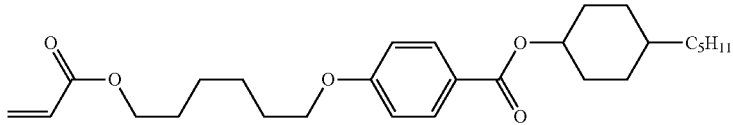
[Chem. 29]
(C-1)
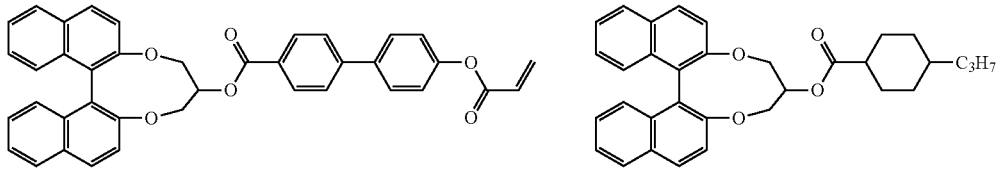
(C-2)
(C-3)
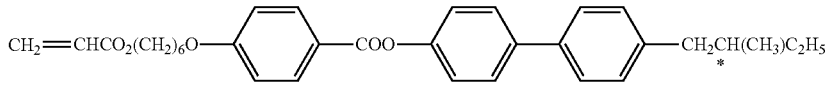
(C-4)
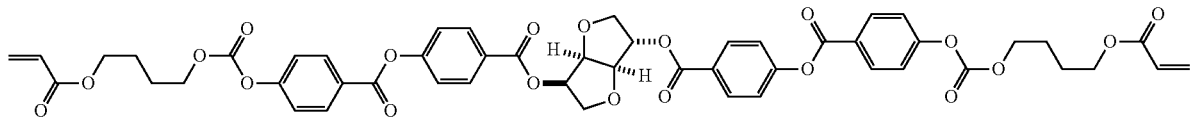
methyl isobutyl ketone (D-1)
p-methoxyphenol (E-1)
IRGANOX1076 (F-1)
Irgacure 907 (G-1)
Irgacure 651 (G-2)
Lucirin TPO (G-3)
[Chem. 30]
(G-4)
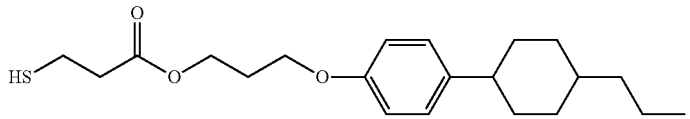
[Chem. 31]
(G-5)
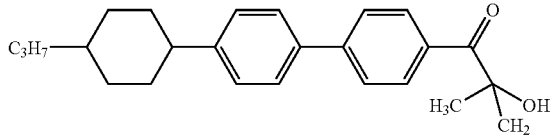
[Chem. 32]
(H-1) (H-7)
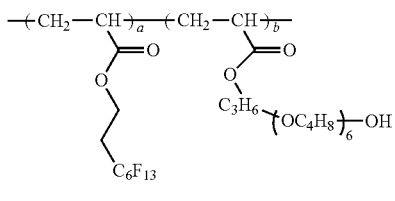
(H-2)
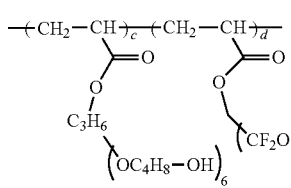 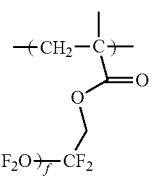

-continued

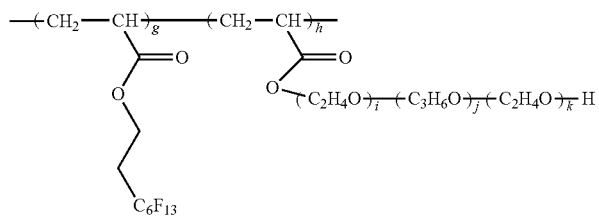
(H-3)

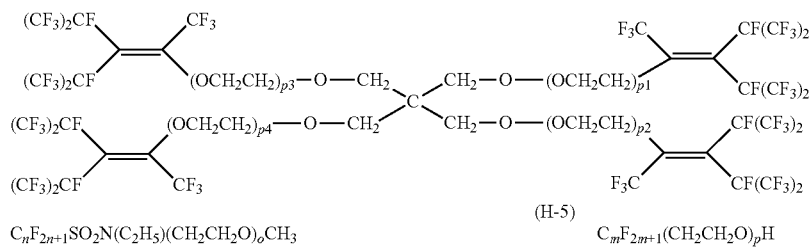
(H-4)

$C_nF_{2n+1}SO_2N(C_2H_5)(CH_2CH_2O)_oCH_3$ (H-5)

$C_mF_{2m+1}(CH_2CH_2O)_pH$ (H-6)

Compound (H-1): a=30, b=70, number average molecular weight of 4,200, weight average molecular weight of 9,500

Compound (H-2): c=70, d=30, e=9, f=6, number average molecular weight of 1,700, weight average molecular weight of 3,600

Compound (H-3): g=30, h=70, i=11, j=22, k=11, number average molecular weight of 5,400, weight average molecular weight of 11,000

Compound (H-4): p1+p2+p3+p4=18, number average molecular weight of 2,800, weight average molecular weight of 3,000

Compound (H-5): o=10, n=8, number average molecular weight of 950, weight average molecular weight of 1,000

Compound (H-6): p=1, m=8, number average molecular weight of 470, weight average molecular weight of 500

Compound (H-7): a=30, b=70, number average molecular weight of 26,500, weight average molecular weight of 60,000

Compound (H-8): BYK-361N (acryl-based surfactant manufactured by BYK Japan KK), number average molecular weight of 1,650, weight average molecular weight of 4,000

Compound (H-9): BYK-325 (silicone-based surfactant manufactured by BYK Japan KK), number average molecular weight of 800, weight average molecular weight of 3,000

Examples 1 to 24 and Comparative Examples 1 and 2

Orientation Properties 1 to 4

The prepared polymerizable liquid crystal composition was applied on a triacetyl cellulose (TAC) film with a bar coater #4 at room temperature, and dried at 80° C. for 2 minutes. Then, after leaving the polymerizable liquid crystal composition at room temperature for 15 minutes, the UV light was emitted by setting the integral of light to be 500 mJ/cm², using a conveyer-type high pressure mercury lamp (orientation properties 1).

A polyimide solution for an oriented film is applied on a glass substrate having a thickness of 0.7 mm at room temperature using a spin coating method, dried at 100° C. for 10 minutes, and fired at 200° C. for 60 minutes to obtain a coating film, and the coating film was subjected to the rubbing treatment to obtain a base material. The prepared polymerizable liquid crystal composition was applied on the base material by a spin coater and dried at 80° C. for 2 minutes. After that, after leaving the polymerizable liquid crystal composition at room temperature for 2 minutes, the UV light is emitted by setting the integral of light to be 500 mJ/cm² (orientation properties 2).

A solution containing a photo-orientation polymer represented by the following Formula (5) was applied on a glass substrate with a spin coater and dried at 80° C. for 1 minute, and the coating film having a thickness of the dried film of 40 nm was irradiated (integral of light: 100 mJ/cm²) with linearly polarized light and parallel light of visible ultraviolet light (irradiation intensity: 20 mW/cm²) having a wavelength of approximately 365 nm through a wavelength cut filter, a band pass filter, and a polarizing filter in a direction vertical to the base material, using an extra-high pressure mercury lamp, to obtain a base material in which a photo-oriented film is laminated. The prepared polymerizable liquid crystal composition was applied to the obtained base material at room temperature using a spin coater and dried at 80° C. for 2 minutes. Then, after leaving the polymerizable liquid crystal composition at room temperature for 2 minutes, the UV light was emitted by setting the integral of light to be 500 mJ/cm² (orientation properties 3).

After performing coating on the glass substrate using a spin coater, drying was performed at 80° C. for 2 minutes. Then, after leaving the polymerizable liquid crystal composition at room temperature for 2 minutes, the UV light is emitted by setting the integral of light to be 500 mJ/cm² (orientation properties 4).

A: no defects are visually observed and no defects are observed even in the observation using a polarizing microscope.

B: no defects are visually observed, but un-oriented portion is partially present in the observation using a polarizing microscope.

C: no defects are visually observed, but un-oriented portion is entirely present in the observation using a polarizing microscope.

D: defects are partially visually observed and un-oriented portion is entirely present in the observation using a polarizing microscope.

The results shown as "-" among the results of the measurement of the orientation properties will be described. "-" is noted because it is difficult to evaluate the orientation properties without an oriented layer having a uniaxial orientation restricting force due to the rubbing or the like, in the case where the composition of the polymerizable liquid crystal composition used shows the horizontal orientation properties, and "-" is noted because it is difficult to evaluate the orientation properties with an oriented layer having a uniaxial orientation restricting force due to the rubbing or the like, in the case where the composition of the polymerizable liquid crystal composition used shows the vertical orientation properties.

[Chem. 33]

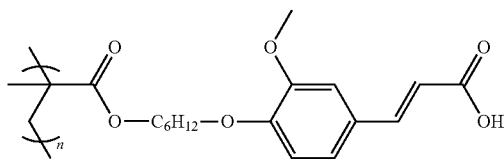

(5)

(Cissing Evaluation)

A photo-oriented polymer represented by Formula (5) was applied on a TAC film with a spin coater and dried at 80° C. for 1 minute, and the coating film having a thickness of the dried film of 40 nm was irradiated (integral of light: 100 mJ/cm$^2$) with linearly polarized light and parallel light of visible ultraviolet light (irradiation intensity: 20 mW/cm$^2$) having a wavelength of approximately 365 nm through a wavelength cut filter, a band pass filter, and a polarizing filter in a direction vertical to the base material, using an extra-high pressure mercury lamp, to obtain a base material in which a photo-oriented film is laminated. The prepared polymerizable liquid crystal composition was applied with a bar coater #4 and dried at 80° C. for 2 minutes. Then, after leaving the polymerizable liquid crystal composition at room temperature for 15 minutes, the coating film having a dry thickness of 1.0 μm was irradiated with the UV light by setting the integral of light to be 500 mJ/cm$^2$, using a conveyer-type high pressure mercury lamp, and the a cissing degree of the obtained film was visually observed.

A: no cissing defects are observed in the surface of the coating film

B: cissing defects are extremely slightly observed in the surface of the coating film C: cissing defects are slightly observed in the surface of the coating film D: cissing defects are considerably observed in the surface of the coating film The obtained results are shown in the following table.

TABLE 3

|  | Solution | Orientation properties 1 | Orientation properties 2 | Orientation properties 3 | Orientation properties 4 | Cissing evaluation |
| --- | --- | --- | --- | --- | --- | --- |
| Example 1 | Solution (1) | A | A | A | — | A |
| Example 2 | Solution (2) | A | A | A | — | A |
| Example 3 | Solution (3) | A | A | A | — | A |
| Example 4 | Solution (4) | A | A | A | — | A |
| Example 5 | Solution (5) | A | A | A | — | A |
| Example 6 | Solution (6) | A | A | A | — | A |
| Example 7 | Solution (7) | A | A | A | — | A |
| Example 8 | Solution (8) | A | A | A | — | A |
| Example 9 | Solution (9) | — | — | — | A | A |
| Example 10 | Solution (10) | — | — | — | A | A |
| Example 11 | Solution (11) | — | — | — | A | A |
| Example 12 | Solution (12) | — | — | — | A | A |
| Example 13 | Solution (13) | A | A | A | — | A |
| Example 14 | Solution (14) | A | A | A | — | A |
| Example 15 | Solution (15) | A | A | A | — | A |
| Example 16 | Solution (16) | A | A | A | — | A |
| Example 17 | Solution (17) | A | A | A | — | A |
| Example 18 | Solution (18) | A | A | A | — | B |
| Example 19 | Solution (19) | A | A | A | — | B |
| Example 20 | Solution (20) | — | — | — | A | B |
| Example 21 | Solution (21) | A | A | A | — | B |
| Example 22 | Solution (22) | A | A | A | — | B |
| Example 23 | Solution (23) | A | A | A | — | B |
| Example 24 | Solution (24) | B | B | B | — | B |
| Comparative Example 1 | Solution (25) | B | B | B | — | D |
| Comparative Example 2 | Solution (26) | B | B | B | — | C |

Examples 1 to 24 and Comparative Examples 1 and 2

As a result, the polymerizable liquid crystal compositions using the fluorine-based surfactant of the present invention have excellent results of orientation properties test and cissing evaluation, and therefore, it can be said that productivity is excellent. Among these, the polymerizable liquid crystal compositions using the fluorine-based surfactant having the specific molecular weight particularly have significantly excellent results of orientation properties test and cissing evaluation. Meanwhile, from the results of Comparative Examples 1 and 2, it is shown that the use of the surfactant other than the fluorine-based surfactant exhibits deteriorated orientation properties test and cissing evaluation, compared to the case of using the polymerizable liquid crystal composition of the present invention.

The invention claimed is:

1. A polymerizable liquid crystal composition comprising: one or more polymerizable compounds represented by General Formula (I),

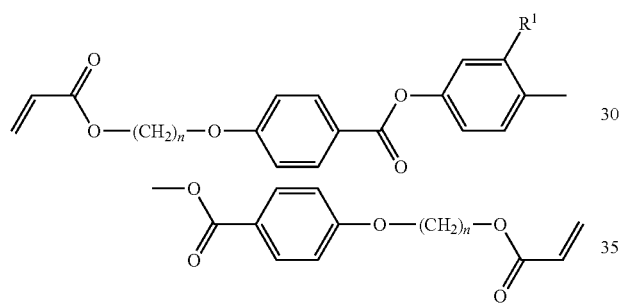

(where n represents an integer of 1 to 10 and $R^1$ represents a hydrogen atom or a methyl group);
at least one polymerizable compound selected from the group consisting of compounds represented by General Formula (II-1) to General Formula (II-5),

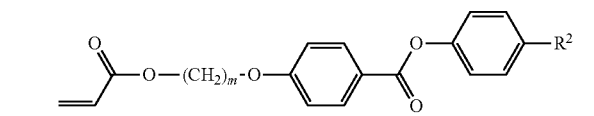
(II-1)

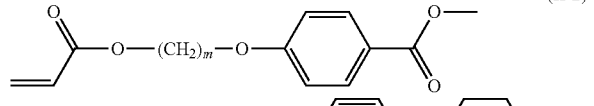
(II-2)

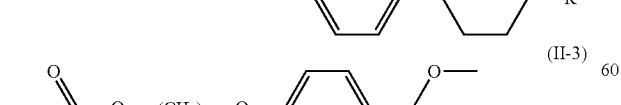
(II-3)

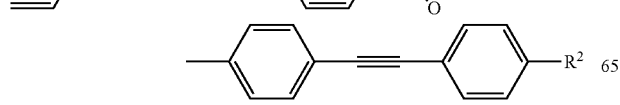
(II-4)

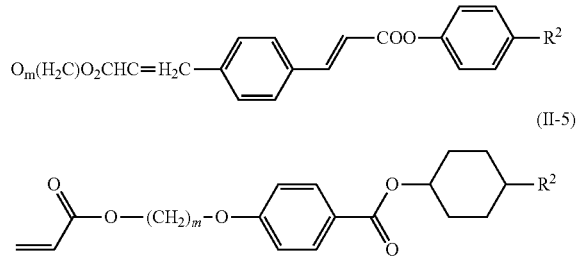
(II-5)

(where m each independently represents an integer of 1 to 10, $R^2$ each independently represents an alkyl group having 1 to 10 carbon atoms, an alkoxy group having 1 to 10 carbon atoms, a hydrogen atom, a fluorine atom, a chlorine atom, or a cyano group, and the 1,4-phenylene group each may be independently substituted with a fluorine atom, a chlorine atom, a $CF_3$ group, a $OCF_3$ group, a cyano group, an alkyl group having 1 to 8 carbon atoms, an alkoxy group, an alkanoyl group, and an alkanoyloxy group); and
a surfactant containing fluorine atom selected from the group consisting of a copolymer (III-1), a copolymer (III-2) and a compound (III-3),
the copolymers (III-1) obtained by performing copolymerization of a first polymerizable monomer including a fluoroalkyl group having 4 to 6 carbon atoms (which may contain an ether bond formed by an oxygen atom), and a second polymerizable monomer including an oxyalkylene group and a polymerizable unsaturated group represented by General Formula (B), as essential monomers:

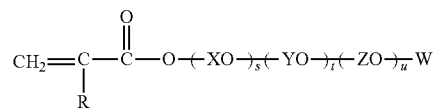
(B)

wherein R represents a hydrogen atom or a methyl group, X, Y, and Z each independently represent an alkylene group, s represents an integer equal to or greater than 1, t and u each represent an integer of 0 or an integer equal to or greater than 1, and W represents a hydrogen atom or an alkyl group having 1 to 6 carbon atoms,
the copolymer (III-2) obtained by performing copolymerization of a polymerizable monomer (D) including a poly(perfluoroalkylene ether) chain and polymerizable unsaturated groups on both terminals thereof, and the second polymerizable monomer represented by the General Formula (B), as essential monomers, and
the compound (III-3) represented by General Formula (III-3):

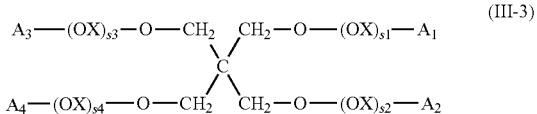
(III-3)

wherein X represents an alkylene group, s1 represents a numerical value of 1 to 80, s2 to s4 are the same as each other or different from each other and represent a numerical value of 0 to 79, and a value of s1+s2+s3+s4 is a numerical value of 4 to 80, $A_1$ represents a fluoroalkyl group or a fluoroalkenyl group, and $A_2$ to $A_4$ are the same as each other or different from each other and represent a hydrogen, a fluoroalkyl group or a fluoroalkenyl group.

2. The polymerizable liquid crystal composition according to claim 1,
wherein the surfactant contains a group represented by —(XO)$_s$— (where X is an alkylene group having 1 to 10 carbon atoms and s is an integer equal to or greater than 1).

3. The polymerizable liquid crystal composition according to claim 1,
wherein at least one of or both of a compound represented by Formula (I-1) and a compound represented by Formula (I-2) are used as the polymerizable compound represented by General Formula (I):

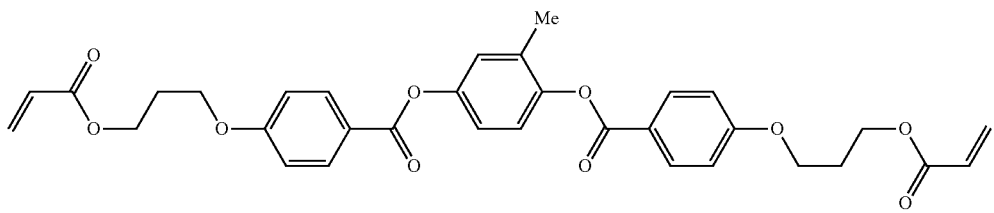

(I-1)

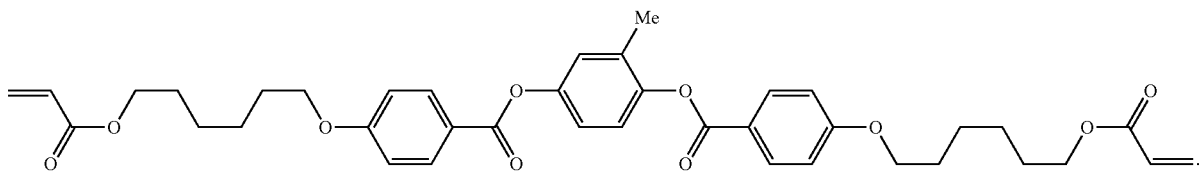

(I-2)

4. An anisotropic optical body prepared from the polymerizable liquid crystal composition according to claim 1.

5. A retardation film prepared from the polymerizable liquid crystal composition according to claim 1.

6. An antireflective film prepared from the polymerizable liquid crystal composition according to claim 1.

7. A liquid crystal display element prepared from the polymerizable liquid crystal composition according to claim 1.

8. The polymerizable liquid crystal composition according to claim 1, wherein a coating film prepared from the polymerizable liquid crystal composition has a surface without cissing defects observed.

* * * * *